United States Patent
Adib et al.

(10) Patent No.: US 9,725,357 B2
(45) Date of Patent: Aug. 8, 2017

(54) GLASS ARTICLES HAVING FILMS WITH MODERATE ADHESION AND RETAINED STRENGTH

(71) Applicant: CORNING INCORPORATED, Corning, NY (US)

(72) Inventors: Kaveh Adib, Corning, NY (US); Robert Alan Bellman, Painted Post, NY (US); Shandon Dee Hart, Corning, NY (US); Guangli Hu, Horseheads, NY (US); Robert George Manley, Vestal, NY (US); Prantik Mazumder, Ithaca, NY (US); Chandan Kumar Saha, Franklin, MI (US)

(73) Assignee: Corning Incorporated, Corning, NY (US)

( * ) Notice: Subject to any disclaimer, the term of this patent is extended or adjusted under 35 U.S.C. 154(b) by 572 days.

(21) Appl. No.: 14/248,868

(22) Filed: Apr. 9, 2014

(65) Prior Publication Data
US 2014/0220327 A1    Aug. 7, 2014

Related U.S. Application Data

(63) Continuation-in-part of application No. 14/053,139, filed on Oct. 14, 2013, and a continuation-in-part of
(Continued)

(51) Int. Cl.
*C03C 17/34* (2006.01)
*C03C 17/36* (2006.01)
(Continued)

(52) U.S. Cl.
CPC ........ *C03C 17/3452* (2013.01); *B32B 17/064* (2013.01); *C03C 3/083* (2013.01);
(Continued)

(58) Field of Classification Search
CPC .......................... C03C 15/00; B32B 17/10018
See application file for complete search history.

(56) References Cited

U.S. PATENT DOCUMENTS

| 4,072,243 A | 2/1978 | Conant et al. .............. 215/12 R |
| 4,640,867 A | 2/1987 | Oyama et al. ................ 428/432 |

(Continued)

FOREIGN PATENT DOCUMENTS

| EP | 2273476 A1 | 1/2011 | .......................... 9/30 |
| EP | 2492250 A1 | 8/2012 | ........................ 17/32 |

(Continued)

OTHER PUBLICATIONS

Patent Cooperation Treaty International Notification of Transmittal of the International Search Report and the Written Opinion of the International Searching Authority, international application No. PCT/US2013/064830; mailing date Feb. 3, 2014, 10 pages.

(Continued)

*Primary Examiner* — Ian Rummel
(74) *Attorney, Agent, or Firm* — Payal A. Patel; Jeffrey A. Schmidt

(57) ABSTRACT

One or more aspects of the disclosure pertain to an article including a film disposed on a glass substrate, which may be strengthened, where the interface between the film and the glass substrate is modified, such that the article has an improved average flexural strength, and the film retains key functional properties for its application. Some key functional properties of the film include optical, electrical and/or mechanical properties. In one or more embodiments, the interface exhibits an effective adhesion energy of about less than about 4 J/m². In some embodiments, the interface is modified by the inclusion of a crack mitigating layer containing an inorganic material between the glass substrate and the film.

12 Claims, 18 Drawing Sheets

Related U.S. Application Data application No. PCT/US2013/064830, filed on Oct. 14, 2013.

(60) Provisional application No. 61/820,395, filed on May 7, 2013, provisional application No. 61/712,908, filed on Oct. 12, 2012.

(51) Int. Cl.
| | | |
|---|---|---|
| G06F 3/041 | (2006.01) | |
| B32B 17/06 | (2006.01) | |
| C03C 3/083 | (2006.01) | |
| C03C 15/00 | (2006.01) | |
| C03C 17/22 | (2006.01) | |
| C03C 17/245 | (2006.01) | |
| C03C 21/00 | (2006.01) | |
| C03C 23/00 | (2006.01) | |

(52) U.S. Cl.
CPC .............. *C03C 15/00* (2013.01); *C03C 17/22* (2013.01); *C03C 17/245* (2013.01); *C03C 17/3417* (2013.01); *C03C 17/3435* (2013.01); *C03C 17/36* (2013.01); *C03C 17/3607* (2013.01); *C03C 17/3621* (2013.01); *C03C 21/002* (2013.01); *C03C 23/0055* (2013.01); *G06F 3/041* (2013.01); *C03C 2217/213* (2013.01); *C03C 2217/214* (2013.01); *C03C 2217/241* (2013.01); *C03C 2217/425* (2013.01); *C03C 2217/78* (2013.01); *C03C 2217/948* (2013.01); *C03C 2218/153* (2013.01); *C03C 2218/17* (2013.01); *C03C 2218/31* (2013.01); *C03C 2218/32* (2013.01); *Y10T 428/24983* (2015.01)

(56) References Cited

U.S. PATENT DOCUMENTS

| | | | | |
|---|---|---|---|---|
| 4,935,296 | A | 6/1990 | Stevens | 428/288 |
| 4,940,636 | A | 7/1990 | Brock et al. | 428/426 |
| 4,995,684 | A | 2/1991 | Tustison et al. | 350/1.6 |
| 6,372,392 | B1 * | 4/2002 | Hoshino | C03C 17/06 216/67 |
| 6,392,735 | B1 | 5/2002 | Tani | 349/156 |
| 6,617,056 | B1 | 9/2003 | Hara et al. | 428/697 |
| 6,707,610 | B1 | 3/2004 | Woodard et al. | 359/582 |
| 7,186,465 | B2 | 3/2007 | Bright | 428/482 |
| 7,763,151 | B2 | 7/2010 | Noguchi et al. | 204/192.29 |
| 8,081,169 | B2 | 12/2011 | Lin et al. | 345/173 |
| 2003/0006704 | A1 | 1/2003 | Morimoto et al. | 313/582 |
| 2003/0143401 | A1 | 7/2003 | Hukari et al. | 428/408 |
| 2004/0115416 | A1 | 6/2004 | Nonninger et al. | 428/304.4 |
| 2008/0286548 | A1 * | 11/2008 | Ellison | C03B 17/06 428/220 |
| 2009/0142790 | A1 | 6/2009 | Fang et al. | |
| 2011/0236604 | A1 | 9/2011 | Fujiwara et al. | 428/1.32 |
| 2012/0196103 | A1 | 8/2012 | Murashige et al. | 428/213 |
| 2012/0223912 | A1 | 9/2012 | Kim | G06F 3/044 |
| 2014/0165654 | A1 | 6/2014 | Bellman et al. | |
| 2014/0166199 | A1 | 6/2014 | Bellman et al. | |
| 2014/0170378 | A1 | 6/2014 | Bellman et al. | |
| 2015/0099110 | A1 | 4/2015 | Bellman et al. | |
| 2015/0329415 | A1 | 11/2015 | Bellman et al. | |

FOREIGN PATENT DOCUMENTS

| | | | |
|---|---|---|---|
| JP | 10182192 | 7/1998 | |
| JP | H10182192 A | 7/1998 | ............. C03C 17/36 |
| WO | 2014146947 A1 | 9/2014 | |
| WO | 2015112958 | 7/2015 | |
| WO | 2015113023 | 7/2015 | |

OTHER PUBLICATIONS

Shyang-ho Chi, Yen-Ling Chung. "Cracking in coating-substrate composites with multi-layered and FGM coatings." Engineering Fracture Mechanics 70 (2003) 1227-1243.
"Standard Test Method for Total Mass Loss and Collected Volatile Condensable Materials from Outgassing in a Vacuum Environment," ASTM International. Designation: E595-07.
Giannelis, Emmanuel. "Polymer Layered Silicate Nanocomposites." Adv. Mater. 1996, 8, No. 1, pp. 29-35.
Myeon-Cheon Choi, Youngkyoo Kim, Chang-Sik Ha. "Polymers for flexible displays: From material selection to device applications." Progress in Polymer Science. vol. 33, Issue 6, Jun. 2008, pp. 581-630.
Cotterell et al "Buckling and Cracking of Thin Films on Compliant Substrates Under Compression"; International Journal of Fracture, 2000. 104(2): p. 169-179.
Girifalco et al "A Theroy for the Estimation of Surface and Interfacial Energies. I. Derivation and Application to Interfacial Tension", J. Phys. Chem., V 61, p904.
Hutchinson et al "Mixed Mode Cracking in Layered Materials"; Advances in Applied Mechanics, vol. 29, 1992, pp. 63-191.
He.; "Crack Deflection at an Interface Between Dissimilar Elastic Materials" International Journal of Solids and Structures, 1989. 25(9): p. 1053-1067.
Wu; "Calculation of Interfacial Tension in Polymer Systems"; J. Polymer. Sci.: Part C, No. 34, pp. 19-30 (1971).
Zeng et al,"Investigation of Mechanical Properties of Transparent Conducting Oxide Thin Films" Thin Solid Films, 2003. 443(1-2): p. 60-65.
International Search Report and Written Opinion of the International Searching Authority; PCT/US2014/060245; Mailed Jan. 21, 2015; 11 Pages.
Chinese First Office Action CN201380063062.0 Dated Jul. 28, 2016, China State Intellectual Property Office, 15 Pgs.
Patent Cooperation Treaty International Notification of Transmittal of the International Search Report and the Written Opinion of the International Searching Authority, international application No. PCT/US2012/066920: mailing date Jan. 21, 2015, 11 pages.

* cited by examiner

GLASS ARTICLES HAVING FILMS WITH MODERATE ADHESION AND RETAINED STRENGTH

CROSS-REFERENCE TO RELATED APPLICATIONS

This application is a continuation-in-part of and claims the benefit of priority under 35 U.S.C. §120 of U.S. application Ser. No. 14/053,139 filed on Oct. 14, 2013, which claims the benefit of priority under 35 U.S.C. §119 of U.S. Provisional Application Ser. No. 61/820,395 filed on May 7, 2013 and the benefit of priority under 35 U.S.C. §119 of U.S. Provisional Application Ser. No. 61/712,908 filed on Oct. 12, 2012, the contents of which are relied upon and incorporated herein by reference in their entirety.

BACKGROUND

This disclosure relates to articles including laminates with a glass substrate that has a film disposed on its surface, and a modified interface between the film and the glass substrate such that the glass substrate substantially retains its average flexural strength, and the film retains key properties for its application.

Articles including a glass substrate, which may be strengthened or strong as described herein, have found wide usage recently as a protective cover glass for displays, especially in touch-screen applications, and there is a potential for their use in many other applications, such as automotive or architectural windows, glass for photovoltaic systems and glass substrates for use in other electronic device applications. In many of these applications it can be advantageous to apply a film to the glass substrates. Exemplary films include indium-tin-oxide ("ITO") or other transparent conductive oxides (e.g., aluminum and gallium doped zinc oxides and fluorine doped tin oxide), hard films of various kinds (e.g., diamond-like carbon, $Al_2O_3$, AlN, $AlO_xN_y$, $Si_3N_4$, $SiO_xN_y$, $SiAl_xO_yN_z$, TiN, TiC), IR or UV reflecting layers, conducting or semiconducting layers, electronics layers, thin-film-transistor layers, or anti-reflection ("AR") films (e.g., $SiO_2$, $Nb_2O_5$ and $TiO_2$ layered structures). In many instances these films must necessarily be hard and/or have a high elastic modulus, or otherwise their other functional properties (e.g., mechanical, durability, electrical conductivity, optical properties) will be degraded. In most cases these films are thin films, that is, they generally have a thickness in the range of 0.005 µm to 10 µm (e.g., 5 nm to 10,000 nm).

When a film is applied to a surface of a glass substrate, which may be strengthened or characterized as strong, the average flexural strength of the glass substrate may be reduced, for example, when evaluated using ball-drop or ring-on-ring strength testing. This behavior has been measured to be independent of temperature effects (i.e., the behavior is not caused by significant or measurable relaxation of surface compressive stress in the strengthened glass substrate due to any heating). The reduction in average flexural strength is also apparently independent of any glass surface damage or corrosion from processing, and is apparently an inherent mechanical attribute of the article, even when thin films having a thickness in the range from about 5 nm to about 10 µm are applied to the article. Without being bound by theory, this reduction in average flexural strength is believed to be associated with the adhesion between such films relative to the strengthened or strong glass substrates, the initially high average flexural strength (or high average strain-to-failure) of selected strengthened or strong glass substrates relative to selected films, together with crack bridging between such a film and the glass substrate.

When these articles employing glass substrates are employed in certain electronic device applications, for example, they may be subjected to additional high temperature processing during manufacturing. More specifically, the articles can be subjected to additional thermal treatments after deposition of the film on the glass substrates. These additional high temperature treatments often are the result of application-specific development of additional structures and components on the substrates and/or films of the article. Further, the deposition of the film itself on the substrate can be conducted at relatively high temperatures.

In view of these new understandings, there is a need to prevent films from reducing the average flexural strength of glass substrates in these articles. There is also a need to ensure that the average flexural strength of the glass substrates is substantially retained, even after high temperature exposures from film deposition processes and additional application-specific thermal treatments.

SUMMARY

A first aspect of this disclosure pertains to an article (e.g., a laminate article) including a glass substrate, a crack mitigating layer disposed on a first major surface of the glass substrate forming a first interface and a film disposed on the crack mitigating layer forming a second interface. In one or more embodiments, the glass substrate has an average strain-to-failure that is greater than the average strain-to-failure of the film. In one or more embodiments, the first interface and/or the second interface exhibit have a moderate adhesion such that at least a portion of the crack mitigating layer separates from the film or the glass substrate when the article is strained to a strain level between the average strain-to-failure of the glass substrate and the average strain-to-failure of the film. In a particular embodiment, at least a portion of the crack mitigating layer separates from the film when a crack originating in the film bridges into the crack mitigating layer (e.g., an adhesive failure at the interface between the film and the crack mitigating layer). In another embodiment, at least a portion of the crack mitigating layer separates from the glass substrate when a crack originating in the glass substrate bridges into the crack mitigating layer (e.g., an adhesive failure at the interface between the glass substrate and the crack mitigating layer). In one or more embodiments, the crack mitigating layer causes a crack originating in one of the film and the glass substrate and entering into the crack mitigating layer to remain within the crack mitigating layer, or substantially within the crack mitigating layer (e.g., a cohesive failure in the crack mitigating layer). In one or more embodiments, the crack mitigating layer effectively confines a crack originating in one of the film and glass substrates from propagating into the other of such film and glass substrate.

In one or more embodiments, the crack mitigating layer has a fracture toughness that is about 50% or less than the fracture toughness of one of the glass substrate and the film. For example, the fracture toughness of the crack mitigating layer may be about 1 MPa·m$^{1/2}$ or less. The thickness of the crack mitigating layer may be about 100 nm or less, about 20 nanometers or less or, in some instances, about 5 nm or less. The crack mitigating layer of one or more embodiments may be a continuous layer or a discontinuous layer.

The crack mitigating layer may include a plasma-polymerized polymer, a silane or a metal. Examples of a plasma-polymerized polymer include a plasma-polymerized fluoropolymer, a plasma-polymerized hydrocarbon polymer, a plasma-polymerized siloxane polymer and a plasma-polymerized silane polymer. The plasma-polymerized hydrocarbon polymer may be a vacuum-deposited material formed from a volatile gas (e.g., an alkane ($C_nH_{2n+2}$), an alkene ($C_nH_{2n}$) and/or an alkyne ($C_nH_{2n-2}$), where n<8) and optionally hydrogen. In another variant, the crack mitigating layer may include a plasma-polymerized fluoropolymer that includes a vacuum-deposited material formed from a polymer-forming fluorocarbon gas (e.g., $CHF_3$ and $C_4F_8$) and a fluorinated etchant (e.g., $CF_4$, $C_2F_6$, $C_3F_8$, $NF_3$, and $SF_6$). Accordingly, the crack mitigating layer may include fluorine. In some embodiments, the fluorine can be derived from a fluorine-containing gas (e.g., $CHF_3$, $C_4F_8$, $CF_4$, $C_2F_6$, $C_3F_8$, $NF_3$, and $SF_6$).

In yet another variant, the crack mitigating layer may include a plasma-polymerized silane polymer including a vacuum-deposited material formed from a silane source material (e.g., a silane source material comprising the formulation $R_xSiX_4$, where R is an alkyl or aryl organic group and X is hydrogen, a halide, and/or an alkoxy group) and an optional oxidizer (e.g., oxygen, ozone, nitrous oxide, carbon dioxide, water vapor, and/or hydrogen peroxide). In one or more embodiments, the crack mitigating layer includes a silane that is either solution-deposited or vapor-deposited, without the use of plasma. The silane may include an aliphatic silane and/or an aromatic silane. The silane may optionally include the formulation $R_xSiX_{4-x}$ where R is a fluorine, an alkyl, an optionally-fluorinated aryl organic group or a chlorinated aryl organic group, and X is a halide or an alkoxy group. In one or more embodiments, the crack mitigating layer may include Au or Cu or may optionally include a porous layer (e.g., porous silica).

In some embodiments, the crack mitigating layer may include a metal fluoride. According to certain embodiments, the crack mitigating layer can be formed as a nanoporous layer that includes an inorganic material. In some cases, the crack mitigating layer includes an inorganic material. The inorganic material can be a metal fluoride (e.g., $CaF_2$, $BaF_2$, $AlF_3$, $MgF_2$, $SrF_2$, $LaF_3$, $YF_3$, and lanthanide series trifluorides) in some embodiments. The inorganic material can also include a reaction product derived at least in part from the glass substrate.

In one or more embodiments, the film may exhibit one or more functional properties (e.g., optical properties, electrical properties and/or mechanical properties), which are substantially the same or retained when combined with the crack mitigating layer (prior to any subsequent separation of the crack mitigating layer from the film and/or glass substrate, as described herein). The film may include transparent conductive oxide layers, IR reflecting layers, UV reflecting layers, conducting layers, semiconducting layers, electronics layers, thin film transistor layers, EMI shielding layers, anti-reflection layers, anti-glare layers, dirt-resistant layers, self-cleaning layers, scratch-resistant layers, barrier layers, passivation layers, hermetic layers, diffusion-blocking layers, and/or fingerprint-resistant layers.

In one or more embodiments, the glass substrate has an average flexural strength that is substantially maintained when combined with the crack mitigating layer and the film. The glass substrate may include an alkali aluminosilicate glass, an alkali containing borosilicate glass and/or an alkali aluminoborosilicate glass. In some embodiments, the glass substrate may be chemically strengthened and may exhibit a compressive stress greater than about 500 MPa and a compressive depth-of-layer greater than about 15 μm.

In one or more embodiments, the article (e.g., a laminate article) has an average flexural strength that that is substantially improved when compared to an article comprising the glass substrate and the film but no crack mitigating layer. In some embodiments, the article exhibits an effective adhesion energy at one or more of the first interface and the second interface of less than about 4 $J/m^2$, or even less than about 0.85 $J/m^2$. In some embodiments, the effective adhesion energy at one or more of the first interface and the second interface is between about 0.1 $J/m^2$ and about 0.85 $J/m^2$, or between about 0.3 $J/m^2$ and about 0.7 $J/m^2$. A second aspect of this disclosure pertains to a method of forming an article (e.g., a laminate article). In one or more embodiments, the method includes providing a glass substrate, disposing a film having one or more functional properties a first opposing major surface forming an interface with the glass substrate, and controlling the effective adhesion energy of the interface to less than about 4 $J/m^2$. In one or more embodiments, the method includes controlling the effective adhesion energy by disposing a crack mitigating layer between the film and the glass substrate. The crack mitigating layer can include fluorine and, in some cases, may further include a metal. According to some embodiments, the crack mitigating layer includes a metal fluoride having the fluorine. The crack mitigating layer can also include an inorganic metal fluoride compound that contains the fluorine. In some embodiments, the fluorine can be derived from a fluorine-containing gas (e.g., $CHF_3$, $C_4F_8$, $CF_4$, $C_2F_6$, $C_3F_8$, $NF_3$, and $SF_6$). According to some other embodiments, the step for controlling the effective adhesion energy of the interface can include a step for effecting a reaction between the fluorine-containing gas and the substrate such that the metal in the crack mitigating layer is derived at least in part from the substrate.

DETAILED DESCRIPTION

Figure 1:
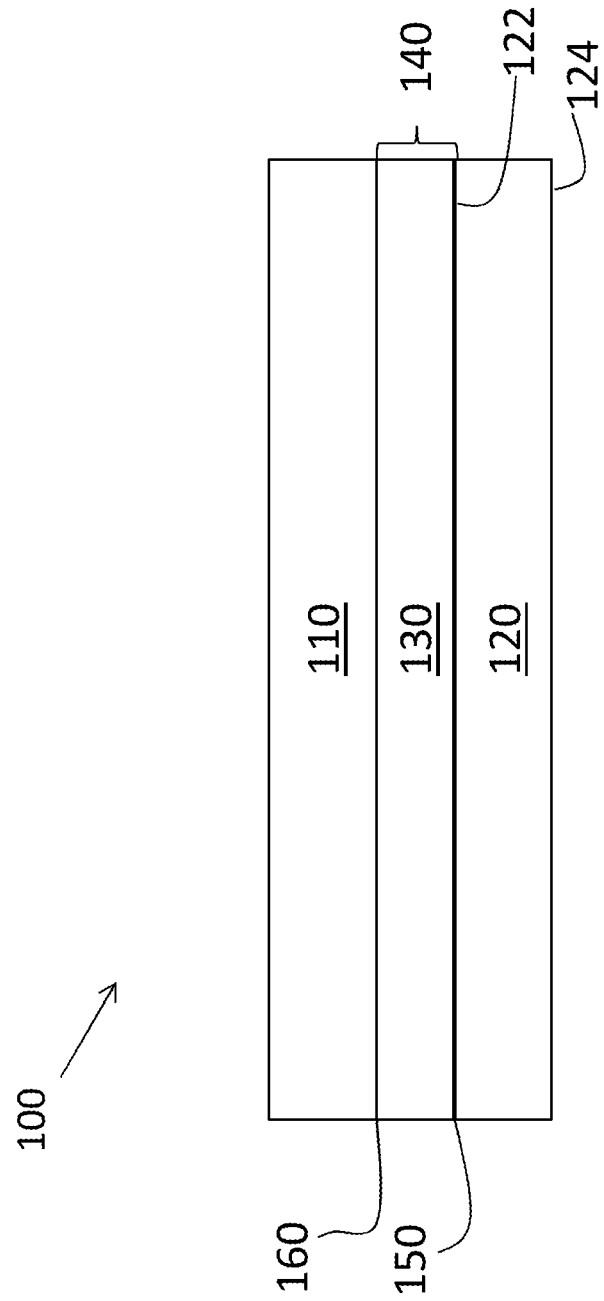
FIG. 1 is an illustration of a laminate article comprising a glass substrate, a film and a crack mitigating layer, according to one or more embodiments.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

Referring to FIG. 1, aspects of this disclosure include a laminate article 100 including a film 110 and a glass substrate 120 wherein the interfacial properties between the film 110 and the glass substrate 120 at the effective interface 140 are modified such that the article substantially retains its average flexural strength, and the film retains key functional properties for its application. In one or more embodiments, the laminate article exhibits functional properties that are also retained after such modification. Functional properties of the film and/or article may include optical properties, electrical properties and/or mechanical properties, such as hardness, elastic modulus, strain-to-failure, abrasion resistance, scratch resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties of the film are retained after combination with the crack mitigating layer, before any separation of the crack mitigating layer from the film and/or glass substrate as described herein.

In one or more embodiment, the modification to the effective interface 140 between the film 110 and the glass substrate 120 includes preventing one or more cracks from bridging from one of the film 110 or the glass substrate 120 into the other of the film 110 or the glass substrate 120, while preserving other functional properties of the film 110 and/or the article. In one or more specific embodiments, as illustrated in FIG. 1, the modification of the interfacial properties includes disposing a crack mitigating layer 130 between the glass substrate 120 and the film 110. In one or more embodiments, the crack mitigating layer 130 is disposed on the glass substrate 120 and forms a first interface 150, and the film 110 is disposed on the crack mitigating layer 130 forming a second interface 160. The effective interface 140 includes the first interface 150, the second interface 160 and/or the crack mitigating layer 130.

The term "film", as applied to the film 110 and/or other films incorporated into the laminated article 100, includes one or more layers that are formed by any known method in the art, including discrete deposition or continuous deposition processes. Such layers may be in direct contact with one another. The layers may be formed from the same material or more than one different material. In one or more alternative embodiments, such layers may have intervening layers of different materials disposed therebetween. In one or more embodiments a film may include one or more contiguous and uninterrupted layers and/or one or more discontinuous and interrupted layers (i.e., a layer having different materials formed adjacent to one another).

As used herein, the term "dispose" includes coating, depositing and/or forming a material onto a surface using any known method in the art. The disposed material may constitute a layer or film as defined herein. The phrase "disposed on" includes the instance of forming a material onto a surface such that the material is in direct contact with the surface and also includes the instance where the material is formed on a surface, where one or more intervening material(s) is between the disposed material and the surface. The intervening material(s) may constitute a layer or film, as defined herein.

As used herein, the term "average flexural strength" is intended to refer to the flexural strength of a glass-containing material (e.g., an article and/or a glass substrate), as tested through methods such as ring-on-ring, ball-on-ring, or ball drop testing. The term "average" when used in connection with average flexural strength or any other property is based on the mathematical average of measurements of such property on at least 5 samples, at least 10 samples or at least 15 samples or at least 20 samples. Average flexural strength may refer to the scale parameter of two parameter Weibull statistics of failure load under ring-on-ring or ball-on-ring testing. This scale parameter is also called the Weibull characteristic strength, at which a material's failure probability is 63.2%. More broadly, average flexural strength may also be defined by other tests such as a ball drop test, where the glass surface flexural strength is characterized by a ball drop height that can be tolerated without failure. Glass surface strength may also be tested in a device configuration, where an appliance or device containing the glass-containing material (e.g., an article and/or a glass substrate) article is dropped in different orientations that may create a surface flexural stress. Average flexural strength may in some cases also incorporate the strength as tested by other methods known in the art, such as 3-point bend or 4-point bend testing. In some cases, these test methods may be significantly influenced by the edge strength of the article.

As used herein, the terms "bridge", or "bridging", refer to crack, flaw or defect formation and such crack, flaw or defect's growth in size and/or propagation from one material, layer or film into another material, layer or film. For example, bridging includes the instance where a crack that is present in the film 110 propagates into another material, layer or film (e.g., the glass substrate 120). The terms "bridge" or "bridging" also include the instance where a crack crosses an interface between different materials, different layers and/or different films. The materials, layers and/or films need not be in direct contact with one another for a crack to bridge between such materials, layers and/or films. For example, the crack may bridge from a first material into a second material, not in direct contact with the first material, by bridging through an intermediate material disposed between the first and second material. The same scenario may apply to layers and films and combinations of materials, layers and films. In the articles described herein, a crack may originate in one of the film 110 or the glass substrate 120 and bridge into the other of the film 110 or the glass substrate 120 across the effective interface 140 (and specifically across the first interface 150 and the second interface 160). As will be described herein, the crack mitigating layer 130 may deflect cracks from bridging between the film 110 and the glass substrate 120, regardless of where (i.e., the film 110 or the glass substrate 120) the crack originates. Crack deflection may include at least partial delamination of the crack mitigating layer 130 from the film 110 and/or glass substrate 120, as described herein, upon bridging of the crack from one material (e.g., the film 110, glass substrate 120 or crack mitigating layer 130) to another material (e.g., the film 110, glass substrate 120 or crack mitigating layer 130). Crack deflection may also include causing a crack to propagate through the crack mitigating layer 130 instead of propagating into the film 110 and/or the glass substrate 120. In such instances, the crack mitigating layer 130 may form a low toughness interface at the effective interface 140 that facilitates crack propagation through the crack mitigating layer instead of into the glass substrate or film. This type of mechanism may be described as deflecting the crack along the effective interface 140.

Figure 2:
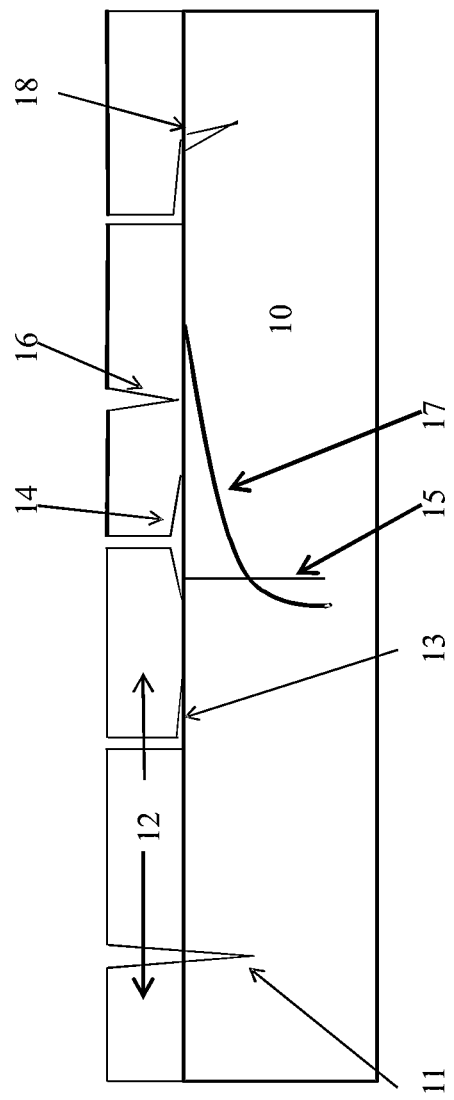
FIG. 2 is a schematic diagram of the development of a crack in a film and its possible bridging modes.

The following theoretical fracture mechanics analysis illustrates selected ways in which cracks may bridge or may be mitigated within a laminated article. FIG. 2 is a schematic illustrating the presence of a crack in a film disposed on a glass substrate and its possible bridging or mitigation modes. The numbered elements in FIG. 2 are the glass substrate 10, the film 12 on top of a surface (unnumbered) of glass substrate 10, a two-sided deflection 14 into the interface between glass substrate 10 and film 12, an arrest 16 (which is a crack that started to develop in film 12 but did not go completely through film 12), a "kinking" 18 (which is a crack that developed in the surface of film 12, but when it reached the surface of the glass substrate 10 it did not penetrate into the glass substrate 12, but instead moves in a lateral direction as indicated in FIG. 2 and then penetrates the surface of the glass substrate 10 at another position), a penetration crack 11 that developed in the film 12 and penetrated into the glass substrate 10, and a one-sided deflection 13. FIG. 2 also shows a graph of tension vs. compression 17 in the glass substrate 10 compared to zero axis 15. As illustrated, upon application of external loading (in such cases, tensile loading is the most detrimental situation), the flaws in the film can be preferentially activated to form cracks prior to the development of cracks in the residually compressed or strengthened glass substrate. In the scenarios illustrated in FIG. 2, with continued increase of external loading, the cracks will bridge until they encounter the glass substrate. When the cracks reach the surface of glass substrate 10 the possible bridging modes of the crack, when it originates in the film are: (a) penetration into the glass substrate without changing its path as represented by numeral 11; (b) deflection into one side along the interface between the film and the glass substrate as indicated by numeral 13; (c) deflection into two sides along the interface as indicated by numeral 14, (d) first deflection along the interface and then kinking into the glass substrate as indicated by numeral 18, or (e) crack arrest as indicated by numeral 16 due to microscopic deformation mechanisms, for example, plasticity, nano-scale blunting, or nano-scale deflection at the crack tip. Cracks may originate in the film and may bridge into the glass substrate. The above described bridging modes are also applicable where cracks originate in the glass substrate and bridge into the film, for example where pre-existing cracks or flaws in the glass substrate may induce or nucleate cracks or flaws in the film, thus leading to crack growth or propagation from the glass substrate into the film, resulting in crack bridging.

Crack penetration into the glass substrate and/or film reduces the average flexural strength of the laminated article and the glass substrate as compared to the average flexural strength of the glass substrate alone (i.e., without a film or a crack mitigating layer), while crack deflection, crack blunting or crack arrest (collectively referred to herein as crack mitigation) helps retain the average flexural strength of the article. Crack blunting and crack arrest can be distinguished from one another. Crack blunting may comprise an increasing crack tip radius, for example, through plastic deformation or yielding mechanisms. Crack arrest, on the other hand, could comprise a number of different mechanisms such as, for example, encountering a highly compressive stress at the crack tip, a reduction of the stress intensity factor at the crack tip resulting from the presence of a low-elastic modulus interlayer or a low-elastic modulus-to-high-elastic modulus interface transition; nano-scale crack deflection or crack tortuosity as in some polycrystalline or composite materials, strain hardening at the crack tip and the like. The various modes of crack deflection will be described herein.

Without being bound by theory, certain possible crack bridging paths can be analyzed in the context of linear elastic fracture mechanics. In the following paragraphs, one crack path is used as an example and the fracture mechanics concept is applied to the crack path to analyze the problem and illustrate the requirements of material parameters to help retain the average flexural strength performance of the article, for a particular range of materials properties.

Figure 3:
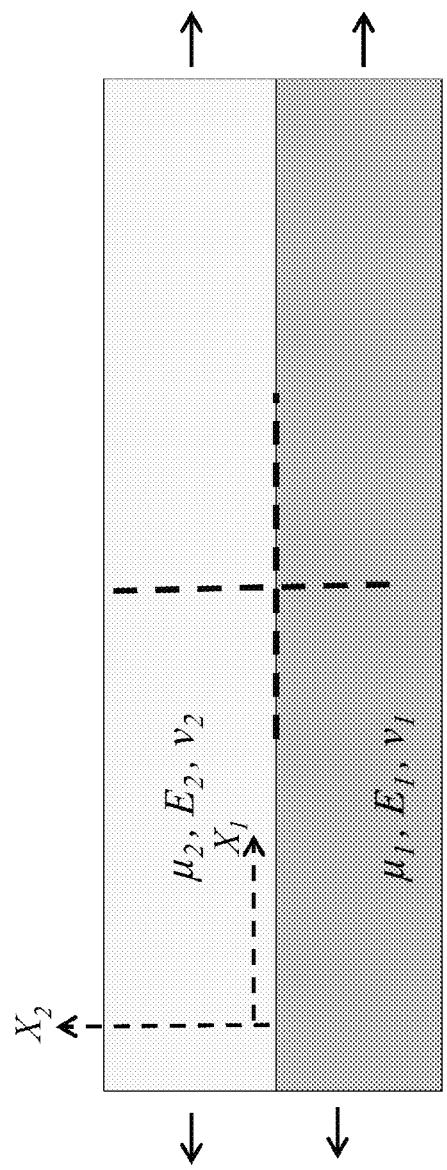
FIG. 3 is an illustration of the theoretical model for the presence of a crack in a film and its possible bridging as a function of elastic mismatch α.

FIG. 3 below shows the illustration of the theoretical model framework. This is a simplified schematic view of the interface region between the film 12 and glass substrate 10. The terms $\mu_1$, $E_1$, $\nu_1$, and $\mu_2$, $E_2$, $\nu_2$, are shear modulus, Young's modulus, Poisson's ratio of glass substrate and film materials, $\Gamma_c^{Glass}$ and $\Gamma_c^{IT}$ are critical energy release rate of glass substrate and the interface between substrate and film, respectively.

The common parameters to characterize the elastic mismatch between the film and the substrate are Dundurs' parameters $\alpha$ and $\beta$, as defined below $$\alpha = \frac{\bar{E}_1 - \bar{E}_2}{\bar{E}_1 + \bar{E}_2} \quad (1)$$

where $\bar{E}=E/(1-\nu^2)$ for plain strain and $$\beta = \frac{1}{2} \frac{\mu_1(1-2\nu_2) - \mu_2(1-2\nu_1)}{\mu_1(1-\nu_2) + \mu_2(1-\nu_1)} \quad (2)$$

It is worth pointing out that critical energy release rate is closely related with the fracture toughness of the material through the relationship defined as $$\Gamma = \frac{1-\nu^2}{E} K_C^2 \quad (3)$$

Under the assumption that there is a pre-existing flaw in the film, upon tensile loading the crack will extend vertically down as illustrated in FIG. 3. Right at the interface, the crack tends to deflect along the interface if $$\frac{G_d}{G_p} \geq \frac{\Gamma_c^{IT}}{\Gamma_c^{Glass}} \quad (4)$$

and the crack will penetrate into the glass substrate if $$\frac{G_d}{G_p} \leq \frac{\Gamma_c^{IT}}{\Gamma_c^{Glass}} \quad (5)$$

where $G_d$ and $G_p$ and are the energy release rates of a deflected crack along the interface and a penetrated crack into the glass substrate, respectively. On the left hand side of equations (4) and (5), the ratio $G_d/G_p$ is a strong function of elastic mismatch parameter $\alpha$ and weakly dependent on $\beta$; and on the right hand side, the toughness ratio $\Gamma_c^{IT}/\Gamma_c^{Glass}$ is a material parameter.

Figure 4:
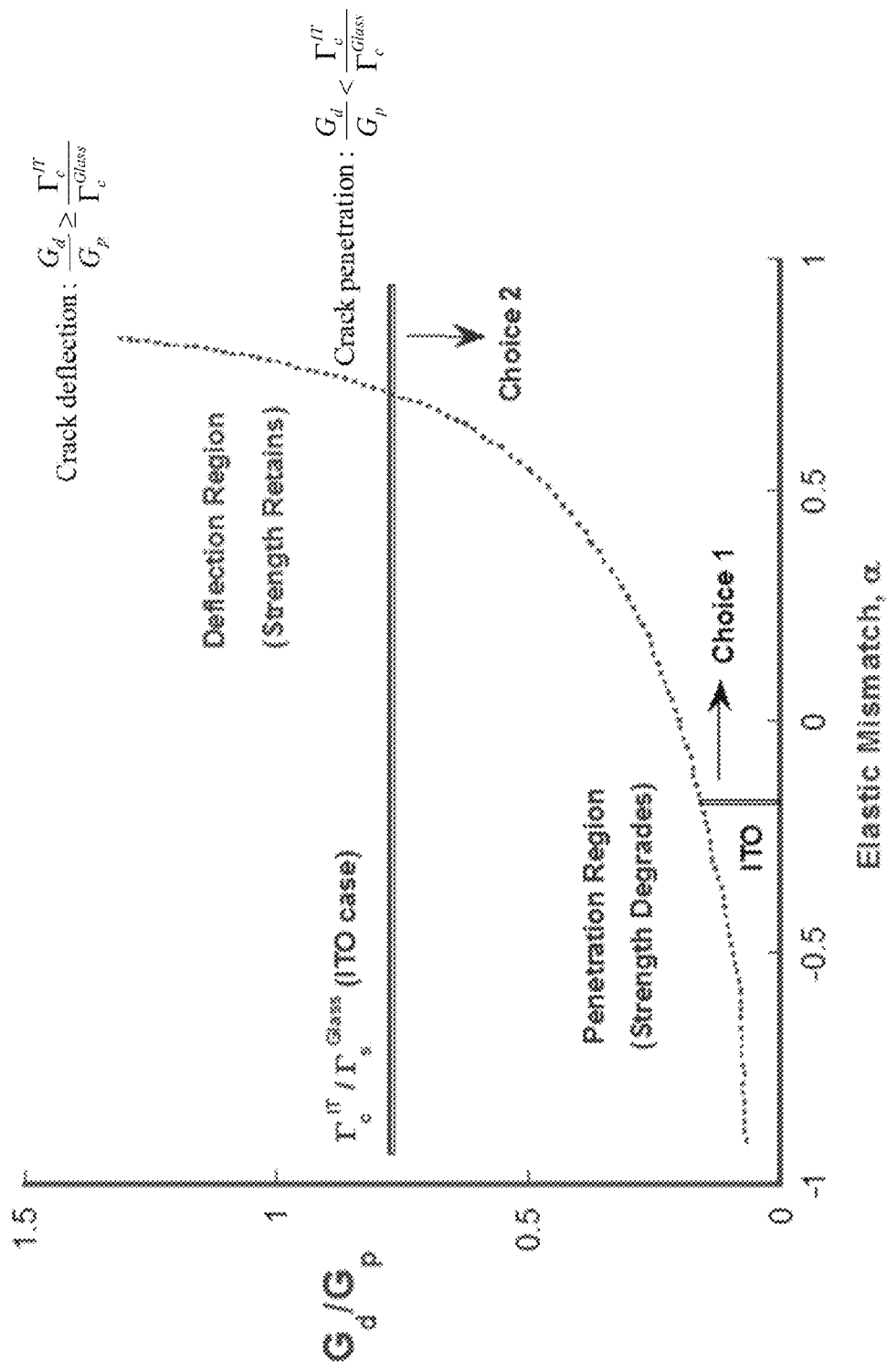
FIG. 4 is a diagram illustrating the energy release ratio $G_d/G_p$.

FIG. 4 graphically illustrates the trend of $G_d/G_p$ as a function of elastic mismatch $\alpha$, reproduced from reference for doubly deflected cracks. (Ming-Yuan, H. and J. W. Hutchinson, *Crack deflection at an interface between dissimilar elastic materials*. International Journal of Solids and Structures, 1989. 25(9): p. 1053-1067.).

It is evident that the ratio $G_d/G_p$ is strongly dependent on $\alpha$. Negative $\alpha$ means the film is stiffer than the glass substrate and positive $\alpha$ means the film is softer than the glass substrate. The toughness ratio $\Gamma_c^{IT}/\Gamma_c^{Glass}$, which is independent of $\alpha$ is a horizontal line in FIG. 4. If criterion (4) is satisfied, in FIG. 4, at the region above the horizontal line, the crack tends to deflect along the interface which may be beneficial for the retention of a substrate's average flexural strength. On the other hand, if the criterion (5) is satisfied, in FIG. 4, at the region below the horizontal line, the crack tends to penetrate into glass substrate which leads to degradation of the average flexural strength of the article, particularly those articles utilizing strengthened or strong glass substrates as described elsewhere herein.

With the above concept, in the following, an indium-tin-oxide (ITO) film is utilized as an illustrative example. For glass substrate, $E_1=72$ GPa, $\nu_1=0.22$, and $K_{1c}=0.7$ MPa m$^{1/2}$; for ITO, $E_2=99.8$ GPa, $\nu_2=0.25$. (Zeng, K., et al., *Investigation of mechanical properties of transparent conducting oxide thin films*. Thin Solid Films, 2003. 443(1-2): p. 60-65.). The interfacial toughness between the ITO film and glass substrate can be approximately $\Gamma_{in}=5$ J/m$^2$, depending on deposition conditions. (Cotterell, B. and Z. Chen, *Buckling and cracking of thin films on compliant substrates under compression*. International Journal of Fracture, 2000. 104(2): p. 169-179.). This will give the elastic mismatch $\alpha=-0.17$ and $\Gamma_c^{IT}/\Gamma_c^{Glass}=0.77$. These values are plotted in FIG. 4. This fracture analysis predicts that the crack penetration into the glass substrate for the ITO film will be favored, which leads to degradation of the average flexural strength of the glass, particularly glass that is strengthened or strong. This is believed to be one of the potential underlying mechanisms observed with various indium-tin-oxide or other transparent conductive oxide films that are disposed on glass substrates, including strengthened or strong glass substrates. As shown in FIG. 4, one way to mitigate the degradation of the average flexural strength can be to select appropriate materials to change the elastic mismatch $\alpha$ (choice 1) or to adjust the interfacial toughness (choice 2).

The theoretical analysis outlined above suggests that a crack mitigating layer 130 can be used to better retain the article strength. Specifically, the insertion of a crack mitigating layer between a glass substrate 120 and a film 110 makes crack mitigation, as defined herein, a more preferred path and thus the article is better able to retain its strength. In some embodiments, the crack mitigating layer 130 facilitates crack deflection, as will be described in greater detail herein.

Glass Substrate

Referring to FIG. 1, the article 100 includes a glass substrate 120, which may be strengthened or strong, as described herein, having opposing major surfaces 122, 124, a film 110 disposed on a at least one opposing major surface (122 or 124) and a crack mitigating layer 130 disposed between the film 110 and the glass substrate 120. In one or more alternative embodiments, the crack mitigating layer 130 and the film 110 may be disposed on the minor surface(s) of the glass substrate in addition to or instead of being disposed on at least one major surface (122 or 124). As used herein, the glass substrate 120 may be substantially planar sheets, although other embodiments may utilize a curved or otherwise shaped or sculpted glass substrate. The glass substrate 120 may be substantially clear, transparent and free from light scattering. The glass substrate may have a refractive index in the range from about 1.45 to about 1.55. In one or more embodiments, the glass substrate 120 may be strengthened or characterized as strong, as will be described in greater detail herein. The glass substrate 120 may be relatively pristine and flaw-free (for example, having a low number of surface flaws or an average surface flaw size less than about 1 micron) before such strengthening. Where strengthened or strong glass substrates 120 are utilized, such substrates may be characterized as having a high average flexural strength (when compared to glass substrates that are not strengthened or strong) or high surface strain-to-failure (when compared to glass substrates that are not strengthened or strong) on one or more major opposing surfaces of such substrates.

Additionally or alternatively, the thickness of the glass substrate 120 may vary along one or more of its dimensions for aesthetic and/or functional reasons. For example, the edges of the glass substrate 120 may be thicker as compared to more central regions of the glass substrate 120. The length, width and thickness dimensions of the glass substrate 120 may also vary according to the article 100 application or use.

The glass substrate 120 according to one or more embodiments includes an average flexural strength that may be measured before and after the glass substrate 120 is combined with the film 110, crack mitigating layer 130 and/or other films or layers. In one or more embodiments described herein, the article 100 retains its average flexural strength after the combination of the glass substrate 120 with the film 110, crack mitigating layer 130 and/or other films, layers or materials, when compared to the average flexural strength of the glass substrate 120 before such combination. In other words, the average flexural strength of the article 100 is substantially the same before and after the film 110, crack mitigating layer 130 and/or other films or layers are disposed on the glass substrate 120. In one or more embodiments, the article 100 has an average flexural strength that is significantly greater than the average flexural strength of a similar article that does not include the crack mitigating layer 130 (e.g. higher strength than an article that comprises film 110 and glass substrate 120 in direct contact, without an intervening crack mitigating layer).

In accordance with one or more embodiments, the glass substrate 120 has an average strain-to-failure that may be measured before and after the glass substrate 120 is combined with the film 110, crack mitigating layer 130 and/or other films or layers. The term "average strain-to-failure" refers to the strain at which cracks propagate without application of additional load, typically leading to catastrophic failure in a given material, layer or film and, perhaps even bridge to another material, layer, or film, as defined herein. Average strain-to-failure may be measured using, for example, ball-on-ring testing. Without being bound by theory, the average strain-to-failure may be directly correlated to the average flexural strength using appropriate mathematical conversions. In specific embodiments, the glass substrate 120, which may be strengthened or strong as described herein, has an average strain-to-failure that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater. In specific embodiments, the glass substrate has an average strain-to-failure of 1.2%, 1.4%, 1.6%, 1.8%, 2.2%, 2.4%, 2.6%, 2.8% or 3% or greater. The average strain-to-failure of the film 110 may be less than the average strain-to-failure of the glass substrate 120 and/or the average strain-to-failure of the crack mitigating layer 130. Without being bound by theory, it is believed that the average strain-to-failure of a glass substrate or any other material is dependent on the surface quality of such material. With respect to glass substrates, the average strain-to-failure of a specific glass substrate is dependent on the conditions of ion exchange or strengthening process utilized in addition to or instead of the surface quality of the glass substrate.

In one or more embodiments, the glass substrate 120 retains its average strain-to-failure after combination with the film 110, crack mitigating layer 130 and/or other films or layers. In other words, the average strain-to-failure of the glass substrate 120 is substantially the same before and after the film 110, crack mitigating layer 130 and/or other films or layers are disposed on the glass substrate 120. In one or more embodiments, the article 100 has an average strain-to-failure that is significantly greater than the average strain-to-failure of a similar article that does not include the crack mitigating layer 130 (e.g. higher strain-to-failure than an article that comprises film 110 and glass substrate 120 in direct contact, without an intervening crack mitigating layer). For example, the article 100 may exhibit an average strain-to-failure that is at least 10% higher, 25% higher, 50% higher, 100% higher, 200% higher or 300% higher than the average strain-to-failure of a similar article that does not include the crack mitigating layer 130.

The glass substrate 120 may be provided using a variety of different processes. For instance, example glass substrate forming methods include float glass processes and down-draw processes such as fusion draw and slot draw.

In the float glass process, a glass substrate that may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that may possess relatively pristine surfaces. Because the average flexural strength of the glass substrate is controlled by the frequency, amount and/or size of surface flaws, a pristine surface that has had minimal contact has a higher initial strength. When this high strength glass substrate is then further strengthened (e.g., chemically), the resultant strength can be higher than that of a glass substrate with a surface that has been lapped and polished. Down-drawn glass substrates may be drawn to a thickness of less than about 2 mm. In addition, down drawn glass substrates may have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, glass substrates may be strengthened to form strengthened glass substrates. As used herein, the term "strengthened glass substrate" may refer to a glass substrate that has been chemically strengthened, for example through ion-exchange of larger ions for smaller ions in the surface of the glass substrate. However, other strengthening methods known in the art, such as thermal tempering, may be utilized to form strengthened glass substrates. As will be described, strengthened glass substrates may include a glass substrate having a surface compressive stress in its surface that aids in the strength preservation of the glass substrate. Strong glass substrates are also within the scope of this disclosure and include glass substrates that may not have undergone a specific strengthening process, and may not have a surface compressive stress, but are nevertheless strong. Such strong glass substrates articles may be defined as glass sheet articles or glass substrates having an average strain-to-failure greater than about 0.5%, 0.7%, 1%, 1.5%, or even greater than 2%. Such strong glass substrates can be made, for example, by protecting the pristine glass surfaces after melting and forming the glass substrate. An example of such protection occurs in a fusion draw method, where the surfaces of the glass films do not come into contact with any part of the apparatus or other surface after forming. The glass substrates formed from a fusion draw method derive their strength from their pristine surface quality. A pristine surface quality can also be achieved through etching or polishing and subsequent protection of glass substrate surfaces, and other methods known in the art. In one or more embodiments, both strengthened glass substrates and the strong glass substrates may comprise glass sheet articles having an average strain-to-failure greater than about 0.5%, 0.7%, 1%, 1.5%, or even greater than 2%, for example when measured using ring-on-ring or ball-on-ring flexural testing.

As mentioned above, the glass substrates described herein may be chemically strengthened by an ion exchange process to provide a strengthened glass substrate 120. The glass substrate may also be strengthened by other methods known in the art, such as thermal tempering. In the ion-exchange process, typically by immersion of the glass substrate into a molten salt bath for a predetermined period of time, ions at or near the surface(s) of the glass substrate are exchanged for larger metal ions from the salt bath. In one embodiment, the temperature of the molten salt bath is about 350° C. to 450° C. and the predetermined time period is about two to about eight hours. The incorporation of the larger ions into the glass substrate strengthens the glass substrate by creating a compressive stress in a near surface region or in regions at and adjacent to the surface(s) of the glass substrate. A corresponding tensile stress is induced within a central region or regions at a distance from the surface(s) of the glass substrate to balance the compressive stress. Glass substrates utilizing this strengthening process may be described more specifically as chemically-strengthened glass substrates 120 or ion-exchanged glass substrates 120. Glass substrates that are not strengthened may be referred to herein as non-strengthened glass substrates.

In one example, sodium ions in a strengthened glass substrate 120 are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened glass substrate 120 that results in a stress profile. The larger volume of the incoming ion produces a compressive stress (CS) on the surface and tension (central tension, or CT) in the center of the strengthened glass substrate 120. Depth of exchange may be described as the depth within the strengthened glass substrate 120 (i.e., the distance from a surface of the glass substrate to a central region of the glass substrate), at which ion exchange facilitated by the ion exchange process takes place.

In one embodiment, a strengthened glass substrate 120 can have a surface compressive stress of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass substrate 120 may have a compressive depth of layer 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate 120 has one or more of the following: a surface compressive stress greater than 500 MPa, a depth of compressive layer greater than 15 μm, and a central tension greater than 18 MPa.

Without being bound by theory, it is believed that strengthened glass substrates 120 with a surface compressive stress greater than 500 MPa and a compressive depth of layer greater than about 15 μm typically have greater strain-to-failure than non-strengthened glass substrates (or, in other words, glass substrates that have not been ion exchanged or otherwise strengthened). In some embodiments, the benefits of one or more embodiments described herein may not be as prominent with non-strengthened or weakly strengthened types of glass substrates that do not meet these levels of surface compressive stress or compressive depth of layer, because of the presence of handling or common glass surface damage events in many typical applications. However, as mentioned previously, in other specific applications where the glass substrate surfaces can be adequately protected from scratches or surface damage (for example by a protective coating or other layers), strong glass substrates with a relatively high strain-to-failure can also be created through forming and protection of a pristine glass surface quality, using methods such as the fusion forming method. In these alternate applications, the benefits of one or more embodiments described herein can be similarly realized.

Example ion-exchangeable glasses that may be used in the strengthened glass substrate 120 may include alkali aluminosilicate glass compositions or alkali aluminoborosilicate glass compositions, though other glass compositions are contemplated. As used herein, "ion exchangeable" means that a glass substrate is capable of exchanging cations located at or near the surface of the glass substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate 120 includes a glass composition with at least 6 wt. % aluminum oxide. In a further embodiment, a glass substrate 120 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the glass substrate 120 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate 120, which may optionally be strengthened or strong, comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq$ (MgO+CaO) $\leq 10$ mol. %.

A still further example glass composition suitable for the glass substrate 120, which may optionally be strengthened or strong, comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq$ (MgO+CaO) $\leq 7$ mol. %.

In a particular embodiment, an alkali aluminosilicate glass composition suitable for the glass substrate 120, which may optionally be strengthened or strong, comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the glass substrate, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq$ MgO+CaO+SrO $\leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In some embodiments, the glass substrate 120, which may optionally be strengthened or strong, may comprise an alkali silicate glass composition comprising: 2 mol % or more of $Al_2O_3$ and/or $ZrO_2$, or 4 mol % or more of $Al_2O_3$ and/or $ZrO_2$.

In some embodiments, the glass substrate used in the glass substrate 120 may be batched with 0-2 mol % of at least one fining agent selected from a group that includes $Na_2SO_4$, NaCl, NaF, NaBr, $K_2SO_4$, KCl, KF, KBr, and $SnO_2$.

The glass substrate 120 according to one or more embodiments can have a thickness ranging from about 50 μm to 5 mm. Example glass substrate 120 thicknesses range from 100 μm to 500 μm, e.g., 100, 200, 300, 400 or 500 μm. Further example glass substrate 120 thicknesses range from 500 μm to 1000 μm, e.g., 500, 600, 700, 800, 900 or 1000 μm. The glass substrate 120 may have a thickness greater than 1 mm, e.g., about 2, 3, 4, or 5 mm. In one or more specific embodiments, the glass substrate 120 may have a thickness of 2 mm or less or less than 1 mm. The glass substrate 120 may be acid polished or otherwise treated to remove or reduce the effect of surface flaws.

Film

The article 100 includes a film 110 disposed on a surface of the glass substrate 120 and specifically on the crack mitigating layer 130. The film 110 may be disposed on one or both major surfaces 122, 124 of the glass substrate 120. In one or more embodiments, the film 110 may be disposed on one or more minor surfaces (not shown) of the glass substrate 120 in addition to or instead of being disposed on one or both major surfaces 122, 124. In one or more embodiments, the film 110 is free of macroscopic scratches or defects that are easily visible to the eye. The film 110 forms the effective interface 140 with the glass substrate 120.

In one or more embodiments, the film may lower the average flexural strength of articles incorporating such films and glass substrate, through the mechanisms described herein. In one or more embodiments, such mechanisms include instances in which the film may lower the average flexural strength of the article because crack(s) developing in such film bridge into the glass substrate. In other embodiments, the mechanisms include instances in which the film may lower the average flexural strength of the article because cracks developing in the glass substrates bridge into the film. The film of one or more embodiments may exhibit a strain-to-failure of 2% or less or a strain-to-failure that is less than the strain to failure of the glass substrates described herein. Films including any of these attributes may be characterized as brittle.

In accordance with one or more embodiments, the film 110 may have a strain-to-failure (or crack onset strain level) that is lower than the strain-to-failure of the glass substrate 120. For example, the film 110 may have strain-to-failure of about 2% or less, about 1.8% or less, about 1.6% or less, about 1.5% or less, about 1.4% or less, about 1.2% or less, about 1% or less, about 0.8% or less, about 0.6% or less, about 0.5% or less, about 0.4% or less or about 0.2% or less. In some embodiments, the strain-to-failure of the film 110 may be lower than that the strain-to-failure of the strengthened glass substrates 120 that have a surface compressive stress greater than 500 MPa and a compressive depth of layer greater than about 15 nm. In one or more embodiments, the film 110 may have a strain-to-failure that is at least 0.1% lower or less, or in some cases, at least 0.5% lower or less than the strain-to-failure of the glass substrate 120. In one or more embodiments, the film 110 may have a strain-to-failure that is at least about 0.15%, 0.2%, 0.25%, 0.3%, 0.35%, 0.4%, 0.45%, 0.55%, 0.6%, 0.65%, 0.7%, 0.75%, 0.8%, 0.85%, 0.9%, 0.95% or 1% lower or less than the strain-to-failure of the glass substrate 120. These strain-to-failure values can be measured, for example, using ball-on-ring flexural test methods combined with optional microscopic or high-speed-camera analysis. In some cases the onset of film cracking may be measured by analyzing the electrical resistivity of a conducting film. These various analyses can be performed during the application of load or stress, or in some cases after the application of load or stress.

Exemplary films 110 may have an elastic modulus of at least 25 GPa and/or a hardness of at least 1.75 GPa, although some combinations outside of this range are possible. In some embodiments the film 110 may have an elastic modulus 50 GPa or greater or even 70 GPa or greater. For example, the film elastic modulus may be 55 GPa, 60 GPa, 65 GPa, 75 GPa, 80 GPa, 85 GPa or more. In one or more embodiments, the film 110 may have a hardness greater than 3.0 GPa. For example, the film 110 may have a hardness of 5 GPa, 5.5 GPa, 6 GPa, 6.5 GPa, 7 GPa, 7.5 GPa, 8 GPa, 8.5 GPa, 9 GPa, 9.5 GPa, 10 GPa or greater. These elastic modulus and hardness values can be measured for such films 110 using known diamond nano-indentation methods that are commonly used for determining the elastic modulus and hardness of films. Exemplary diamond nano-indentation methods may utilize a Berkovich diamond indenter.

The films 110 described herein may also exhibit a fracture toughness less than about 10 $MPa \cdot m^{1/2}$, or in some cases less than 5 $MPa \cdot m^{1/2}$, or in some cases less than 1 $MPa \cdot m^{1/2}$. For example, the film may have a fracture toughness of 4.5 $MPa \cdot m^{1/2}$, 4 $MPa \cdot m^{1/2}$, 3.5 $MPa \cdot m^{1/2}$, 3 $MPa \cdot m^{1/2}$, 2.5 $MPa \cdot m^{1/2}$, 2 $MPa \cdot m^{1/2}$, 1.5 $MPa \cdot m^{1/2}$, 1.4 $MPa \cdot m^{1/2}$, 1.3 $MPa \cdot m^{1/2}$, 1.2 $MPa \cdot m^{1/2}$, 1.1 $MPa \cdot m^{1/2}$, 0.9 $MPa \cdot m^{1/2}$, 0.8 $MPa \cdot m^{1/2}$, 0.7 $MPa \cdot m^{1/2}$, 0.6 $MPa \cdot m^{1/2}$, 0.5 $MPa \cdot m^{1/2}$, 0.4 $MPa \cdot m^{1/2}$, 0.3 $MPa \cdot m^{1/2}$, 0.2 $MPa \cdot m^{1/2}$, 0.1 $MPa \cdot m^{1/2}$ or less.

The films 110 described herein may also have a critical strain energy release rate ($G_{IC} = K_{IC}^2/E$) that is less than about 0.1 $kJ/m^2$, or in some cases less than 0.01 $kJ/m^2$. In one or more embodiments, the film 110 may have a critical strain energy release rate of 0.09 $kJ/m^2$, 0.08 $kJ/m^2$, 0.07 $kJ/m^2$, 0.06 $kJ/m^2$, 0.05 $kJ/m^2$, 0.04 $kJ/m^2$, 0.03 $kJ/m^2$, 0.02 $kJ/m^2$, 0.0075 $kJ/m^2$, 0.005 $kJ/m^2$, 0.0025 $kJ/m^2$ or less.

In one or more embodiments, the film 110 may include a plurality of layers. In one or more embodiments, each of the layers of the film may be characterized as brittle based on one or more of the layer's impact on the average flexural strength of the article and/or the layer's strain-to-failure, fracture toughness, or critical strain energy release rate values, as otherwise described herein. In one variant, the layers of the film 110 need not have identical properties such as elastic modulus and/or fracture toughness. In another variant, the layers of the film 110 may include different materials from one another.

The compositions or material(s) of the film 110 are not particularly limited. Some non-limiting examples of film 110 materials include oxides such as $SiO_2$, $Al_2O_3$, $TiO_2$, $Nb_2O_5$, $Ta_2O_5$; oxynitrides such as $SiO_xN_y$, $SiAl_xO_yN_z$, and $AlO_xN_y$; nitrides such as $SiN_x$, $AlN_x$, cubic boron nitride, and $TiN_x$; carbides such as SiC, TiC, and WC; combinations of the above such as oxycarbides and oxy-carbo-nitrides (for example, $SiC_xO_y$ and $SiC_xO_yN_z$); semiconductor materials such as Si and Ge; transparent conductors such as indium-tin-oxide, tin oxide, fluorinated tin oxide, aluminum zinc oxide, or zinc oxide; carbon nanotube or graphene-doped oxides; silver or other metal-doped oxides, highly siliceous polymers such as highly cured siloxanes and silsesquioxanes; diamond or diamond-like-carbon materials; or selected metal films which can exhibit a fracture behavior.

The film 110 can be disposed on the glass substrate 120 by vacuum deposition techniques, for example, chemical vapor deposition (e.g., plasma enhanced chemical vapor deposition, atmospheric pressure chemical vapor deposition, or plasma-enhanced atmospheric pressure chemical vapor deposition), physical vapor deposition (e.g., reactive or nonreactive sputtering or laser ablation), thermal, resistive, or e-beam evaporation, or atomic layer deposition. The film 110 may also be disposed on one or more surfaces 122, 124 of the glass substrate 120 using liquid-based techniques, for example sol-gel coating or polymer coating methods, for example spin, spray, slot draw, slide, wire-wound rod, blade/knife, air knife, curtain, gravure, and roller coating among others. In some embodiments it may be desirable to use adhesion promoters, such as silane-based materials, between the film 110 and the glass substrate 120, between the glass substrate 120 and crack mitigating layer 130, between the layers (if any) of the crack mitigating layer 130, between the layers (if any) of the film 110 and/or between the film 110 and the crack mitigating layer 130. In one or more alternative embodiments, the film 110 may be disposed on the glass substrate 120 as a transfer layer.

The film 110 thickness can vary depending on the intended use of the article 100. In one embodiment the film 110 thickness may be in the ranges from about 0.005 μm to about 0.5 μm or from about 0.01 μm to about 20 μm. In another embodiment, the film 110 may have a thickness in the range from about 0.05 μm to about 10 μm, from about 0.05 μm to about 0.5 μm, from about 0.01 μm to about 0.15 μm or from about 0.015 μm to about 0.2 μm.

In some embodiments it may be advantageous to include a material in the film 110 that has either:

(1) a refractive index that is similar to the refractive index of either the glass substrate 120, the crack mitigating layer 130 and/or other films or layers in order to minimize optical interference effects;

(2) a refractive index (real and/or imaginary components) that is tuned to achieve anti-reflective interference effects; and/or (3) a refractive index (real and/or imaginary components) that is tuned to achieve wavelength-selective reflective or wavelength-selective absorptive effects, such as to achieve UV or IR blocking or reflection, or to achieve coloring/tinting effects.

In one or more embodiments, the film 110 may have a refractive index that is greater than the refractive index of the glass substrate 120 and/or greater than the refractive index of the crack mitigating layer 130. In one or more embodiments, the film may have a refractive index in the range from about 1.7 to about 2.2, or in the range from about 1.4 to about 1.6, or in the range from about 1.6 to about 1.9.

The film 110 may also serve multiple functions, or be integrated with additional film(s) or layers as described herein that serve other functions than the film 110 or even the same function(s) as the film 110. The film 110 may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the film 110 may include conducting or semi-conducting layers, thin film transistor layers, EMI shielding layers, breakage sensors, alarm sensors, electrochromic materials, photochromic materials, touch sensing layers, or information display layers. The film 110 and/or any of the foregoing layers may include colorants or tint. When information display layers are integrated into the article 100, the article 100 may form part of a touch-sensitive display, a transparent display, or a heads-up display. It may be desirable that the film 110 performs an interference function, which selectively transmits, reflects, or absorbs different wavelengths or colors of light. For example, the films 110 may selectively reflect a targeted wavelength in a heads-up display application.

Functional properties of the film 110 may include optical properties, electrical properties and/or mechanical properties, such as hardness, elastic modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the film 110 is combined with the glass substrate 120, crack mitigating layer 130 and/or other films included in the article 100.

Crack Mitigating Layer

As described herein, the crack mitigating layer provides a moderate adhesion energy at the effective interface 140. The crack mitigating layer 130 provides a moderate adhesion energy by forming a low toughness layer at the effective interface that facilitates crack deflection into the crack mitigating layer instead of the film 110 or glass substrate 120. The crack mitigating layer 130 may also provide a moderate adhesion energy by forming a low toughness interface. The low toughness interface is characterized by delamination of the crack mitigating layer 130 from the glass substrate 120 or film 110 upon application of a specified load. This delamination causes cracks to deflect along either the first interface 150 or the second interface 160. Cracks may also deflect along a combination of the first and second interfaces 150 and 160, for example following a path which may cross over from one interface to the other.

In one or more embodiments, crack mitigating layer 130 provides moderate adhesion by modifying the effective adhesion energy at the effective interface 140 between the glass substrate 120 and the film 110. In one or more specific embodiments, one or both of the first interface 150 and the second interface 160 exhibit the effective adhesion energy. In one or more embodiments, the effective adhesion energy may be about 5 J/m$^2$ or less, about 4.5 J/m$^2$ or less, about 4 J/m$^2$ or less, about 3.5 J/m$^2$ or less, about 3 J/m$^2$ or less, about 2.5 J/m$^2$ or less, about 2 J/m$^2$ or less, about 1.5 J/m$^2$ or less, about 1 J/m$^2$ or less or about 0.85 J/m$^2$ or less. The lower limit of the effective adhesion energy may be about 0.1 J/m$^2$ or about 0.01 J/m$^2$. In one or more embodiments, the effective adhesion energy at one or more of the first interface and the second interface may be in the range from about 0.85 J/m$^2$ to about 3.85 J/m$^2$, from about 0.85 J/m$^2$ to about 3 J/m$^2$, from about 0.85 J/m$^2$ to about 2 J/m$^2$, and from about 0.85 J/m$^2$ to about 1 J/m$^2$. The effective adhesion energy at one or more of the first interface and the second interface can also be between about 0.1 J/m$^2$ and about 0.85 J/m$^2$, or between about 0.3 J/m$^2$ and about 0.7 J/m$^2$. According to some embodiments, the effective adhesion energy at one or more of the first interface and the second interface remains substantially constant, or within a target range such as from 0.1 J/m$^2$ and about 0.85 J/m$^2$, from ambient temperature up to about 600° C. In some embodiments, the effective adhesion energy at one or more of the interfaces is at least 25% less than the average cohesive adhesion energy of the glass substrate from ambient temperature up to about 600° C.

In embodiments in which the effective interface, 140, the first interface 150 and/or the second interface 160 exhibits moderate adhesion, at least a portion of the crack mitigating layer may separate from the glass substrate and/or the film during a loading process that causes crack growth and/or crack formation in the film and/or the crack mitigating layer. When at least a portion of the crack mitigating layer separates from the glass substrate 120 and/or the film 110, such separation may include a reduced adhesion or no adhesion between the crack mitigating layer and the glass substrate 120 and/or film 110 from which the crack mitigating layer separates. In other embodiments, when only a portion of the crack mitigating layer separates, such separated portion may be surrounded completely or at least partially by portions of the crack mitigating layer still adhered to the glass substrate 120 and/or film 110. In one or more embodiments, at least a portion of the crack mitigating layer 130 may separate from one of the film 110 or the glass substrate 120 when the laminated article is strained at a specified strain level during such loading. In one or more embodiments, the strain level may be between the first average strain-to-failure of the glass substrate 120 and the average strain-to-failure of the film 110.

In one or more specific embodiments, at least a portion of the crack mitigating layer 130 separates from the film 110 when a crack originating in the film 110 bridges into the crack mitigating layer 130 (or crosses the second interface 160). In a particular embodiment, at least a portion of the crack mitigating layer 130 separates from the film 110 as an adhesive failure 190 at the interface 160 (see FIG. 9B) when a crack originating in the film 110 bridges into the crack mitigating layer 130. In other embodiments, at least a portion of the crack mitigating layer 130 separates from the glass substrate 120 when a crack originating in the glass substrate 120 bridges into the crack mitigating layer 130 (or crosses the first interface 150). In another particular embodiment, at least a portion of the crack mitigating layer 130 separates from the glass substrate 120 as an adhesive failure 190 at the interface 150 (see FIG. 9B) when a crack originating in the glass substrate 120 bridges into the crack mitigating layer 130. As used herein, the term "adhesive failure" relates to crack propagation substantially confined to one or more of the interfaces 150 and 160 between the crack mitigating layer 130, the film 110 and the glass substrate 120.

The crack mitigating layer does not separate and remains adhered to the glass substrate 120 and the film 110 at load levels that do not cause crack growth and/or crack formation (i.e., at average strain-to-failure levels less than the average strain-to-failure of the glass substrate and less than the average strain-to-failure of the film). Without being bound by theory, delamination or partial delamination of the crack mitigating layer 130 reduces the stress concentrations in the glass substrate 120. Accordingly, it is believed that a reduction in stress concentrations in the glass substrate 120 causes an increase in the load or strain level that is required for the glass substrate 120 (and ultimately the laminated article 100) to fail. In this manner, the crack mitigating layer 130 prevents a decrease or increases the average flexural strength of the laminated article, as compared to laminated articles without the crack mitigating layer.

The material and thickness of the crack mitigating layer 130 can be used to control the effective adhesion energy between glass substrate 120 and the film 110. In general, the adhesion energy between two surfaces is given by ("A theory for the estimation of surface and interfacial energies. I. derivation and application to interfacial tension", L. A. Girifalco and R. J. Good, J. Phys. Chem., V 61, p 904):

$$W = \gamma_1 + \gamma_2 - \gamma_{12} \qquad (6)$$

where, $\gamma_1$, $\gamma_2$ and $\gamma_{12}$ are the surface energies of surface 1, surface 2 and the interfacial energy of surface 1 and 2 respectively. The individual surface energies are usually a combination of two terms; a dispersion component $\gamma^d$, and a polar component $\gamma^p$ $$\gamma = \gamma^d + \gamma^p \quad (7)$$

When the adhesion is mostly due to London dispersion forces ($\gamma^d$) and polar forces for example hydrogen bonding ($\gamma^p$), the interfacial energy could be given by (Girifalco and R, J. Good, as mentioned above):

$$\gamma_{12} = \gamma_1 + \gamma_2 - 2\sqrt{\gamma_1^d \gamma_2^d} - 2\sqrt{\gamma_1^p \gamma_2^p} \quad (8)$$

After substituting (6) into (8), the energy of adhesion could be approximately calculated as:

$$W \sim 2[\sqrt{\gamma_1^d \gamma_2^d} + \sqrt{\gamma_1^p \gamma_2^p}] \quad (9)$$

In the above equation (9), only van der Waal (and/or hydrogen bonding) components of adhesion energies are considered. These include polar-polar interaction (Keesom), polar-non polar interaction (Debye) and nonpolar-nonpolar interaction (London). However, other attractive energies may also be present, for example covalent bonding and electrostatic bonding. So, in a more generalized form, the above equation is written as:

$$W \sim 2[\sqrt{\gamma_1^d \gamma_2^d} + \sqrt{\gamma_1^p \gamma_2^p}] + w_c + w_e \quad (10)$$

where $w_e$ and $W_e$ are the covalent and electrostatic adhesion energies. Equation (10) describes that the adhesion energy is a function of four surface energy parameters plus the covalent and electrostatic energy, if any. An appropriate adhesion energy can be achieved by choice of crack mitigating layer 130 material(s) to control van der Waals (and/or hydrogen) bonding and/or covalent bonding.

The adhesive energy of thin films is challenging to directly measure, including the adhesive energy between the crack mitigating layer 130 and the glass substrate 120 or film 110. In contrast, the bond strength of the bond between two pieces of glass can be determined by inserting a thin blade and measuring the crack length. In the case of a thin glass bonded to a thicker carrier with a coating or surface modification, the bond adhesion energy $\gamma$ is related to the carrier Young's modulus $E_1$, carrier thickness $t_{w1}$, thin glass modulus $E_2$, thin glass thickness $t_{w2}$, blade thickness $t_b$, and crack length L by the following equation, given by Equation (11) below.

$$\gamma = \frac{3 t_b^2 E_1 t_{w1}^3 E_2 t_{w2}^3}{16 L^4 (E_1 t_{w1}^3 + E_2 t_{w2}^3)} \quad (11)$$

Equation (11) can be employed to approximate the adhesive energy between the crack mitigating layer 130 and the glass substrate 120 or film 110 (e.g., the adhesive energy at the interfaces 150 and 160, respectively). For example, the adhesive energy between two glass substrates (e.g., one thick and one thin) can be measured using Equation (11) as a control. Various glass substrate samples can then be prepared by conducting a surface treatment to a control glass substrate (e.g., a thick carrier substrate). The surface treatment is exemplary of a particular crack mitigating film 130. After the surface treatment, the treated glass substrate is then bonded to a thin glass substrate comparable to the thin substrates employed as the control. The adhesive energy for the treated samples can then be measured using Equation (11) and then compared to the results obtained from comparable measurements to the glass control samples.

Figure 9A:
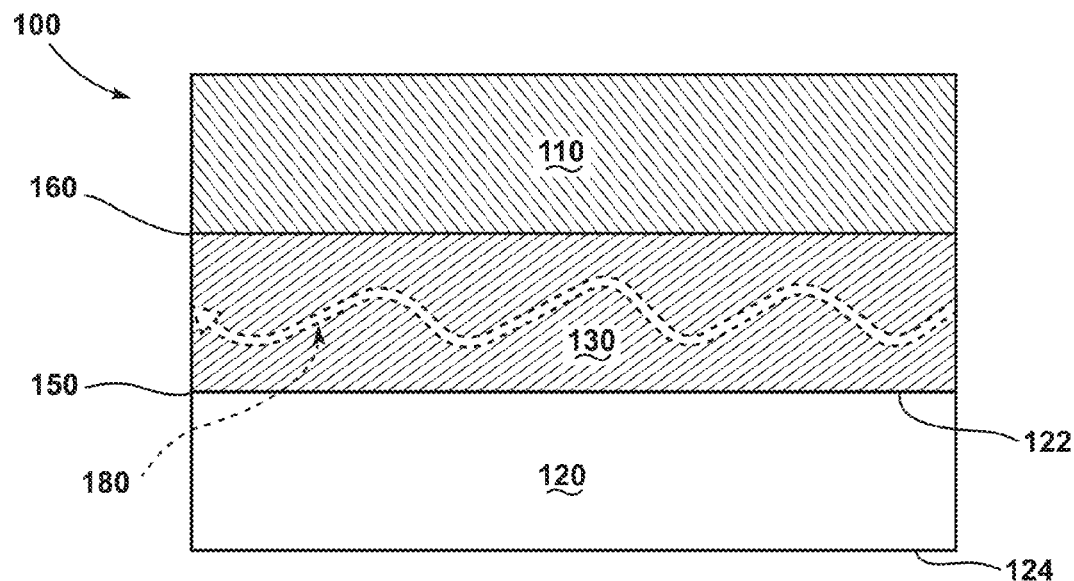
FIG. 9A is a schematic diagram of a cohesive failure in a crack mitigating layer according to an aspect of this disclosure.
Figure 9B:
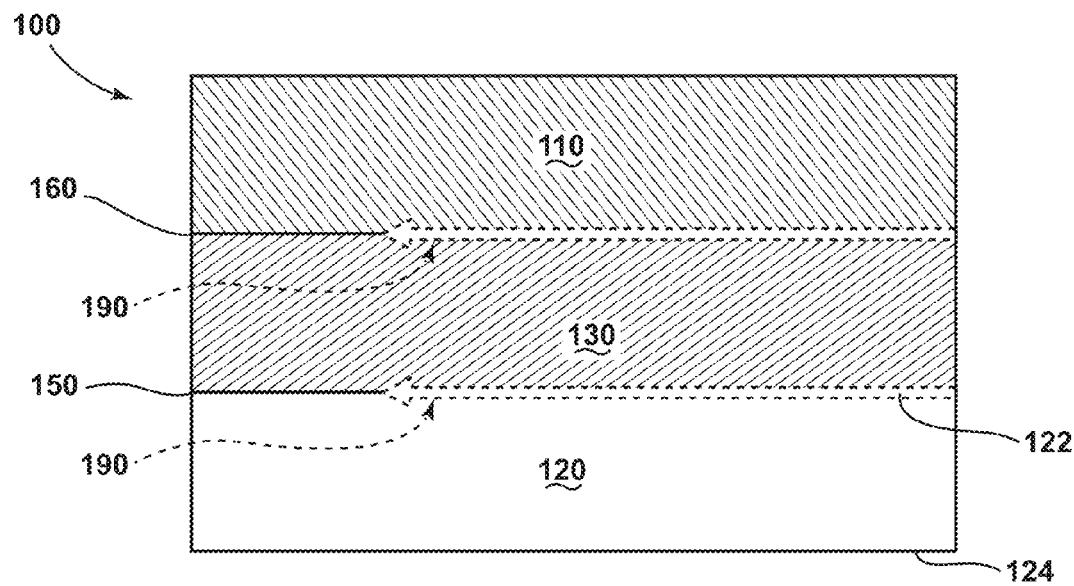
FIG. 9B is a schematic diagram of adhesive failures associated with a crack mitigating layer according to an aspect of this disclosure.

In one or more embodiments, the crack mitigating layer 130 may form a preferred path of crack propagation other than bridging between the film 110 and the glass substrate 120. In other words, the crack mitigating layer 130 may deflect a crack forming in one of the film 110 and the glass substrate 120 and propagating toward the other of the film 110 and the glass substrate 120 into the crack mitigating layer 130. In such embodiments, the crack may propagate through the crack mitigating layer 130 in a direction substantially parallel to at least one of the first interface 150 or the second interface 160. As depicted in FIG. 9A, the crack becomes a cohesive failure 180, confined within the crack mitigating layer 130. As used herein, the term "cohesive failure" relates to crack propagation substantially confined within the crack mitigating layer 130.

The crack mitigating layer 130, when configured to develop a cohesive failure 180 as shown in FIG. 9, provides a preferred path for crack propagation in such embodiments. The crack mitigating layer 130 may cause a crack originating in the film 110 or the glass substrate 120 and entering into the crack mitigating layer 130 to remain in the crack mitigating layer. Alternatively or additionally, the crack mitigating layer 130 effectively confines a crack originating in one of the film 110 and glass substrate 120 from propagating into the other of such film and glass substrate. These behaviors may be characterized individually or collectively as crack deflection. In this way, the crack is deflected from bridging between the film 110 and the glass substrate 120. In one or more embodiments, the crack mitigating layer 130 may provide a low toughness layer or interface that exhibits a low fracture toughness and/or a low critical strain energy release rate, which may promote crack deflection into the crack mitigating layer 130 instead of through the crack mitigating layer into the film 110 and/or glass substrate 120. As used herein, "facilitate" includes creating favorable conditions in which the crack deflects into the crack mitigating layer 130 instead of propagating into the glass substrate 120 or the film 110. "Facilitate" may also include creating a less tortuous path for crack propagation into and/or through the crack mitigating layer 130 instead of into the glass substrate 120 or the film 110.

The crack mitigating layer 130 may exhibit a relatively low fracture toughness to provide a low toughness crack mitigating layer, as will be described in greater detail below. In such embodiments, the crack mitigating layer 130 may exhibit a fracture toughness that is about 50% or less than 50% of the fracture toughness of either the glass substrate 120 or the film 110. In more specific embodiments, the fracture toughness of the crack mitigating layer 130 may be about 25% or less than 25% of the fracture toughness of either the glass substrate 120 or the film 110. For example, the crack mitigating layer 130 may exhibit a fracture toughness of about 1 MPa·m$^{1/2}$ or less, 0.75 MPa·m$^{1/2}$ or less, 0.5 MPa·m$^{1/2}$ or less, 0.4 MPa·m$^{1/2}$ or less, 0.3 MPa·m$^{1/2}$ or less, 0.25 MPa·m$^{1/2}$ or less, 0.2 MPa·m$^{1/2}$ or less, 0.1 MPa·m$^{1/2}$ or less, and all ranges and sub-ranges there between.

In accordance with one or more embodiments, the crack mitigating layer 130 may have an average strain-to-failure that is greater than the average strain-to-failure of the film 110. In one or more embodiments, the crack mitigating layer 130 may have an average strain-to-failure that is equal to or greater than about 0.5%, 0.7%, 1%, 1.5%, 2%, or even 4%. The crack mitigating layer 130 may have an average strain-to-failure of 0.6%, 0.8%, 0.9%, 1.1%, 1.2%, 1.3%, 1.4%, 1.6%, 1.7%, 1.8%, 1.9%, 2.2%, 2.4%, 2.6%, 2.8%, 3%, 3.2%, 3.4%, 3.6%, 3.8%, 5% or 6% or greater. In one or more embodiments, the film 110 may have an average strain-to-failure (crack onset strain) that is 1.5%, 1.0%, 0.7%, 0.5%, or even 0.4% or less. The film 110 may have an average strain-to-failure of 1.4%, 1.3%, 1.2%, 1.1%, 0.9%, 0.8%, 0.6%, 0.3%, 0.2%, 0.1% or less. The average strain-to-failure of the glass substrate 120 may be greater than the average strain-to-failure of the film 110, and in some instances, may be greater than the average strain-to-failure of the crack mitigating layer 130. In some specific embodiments, the crack mitigating layer 130 may have a higher average strain-to-failure than the glass substrate, to minimize any negative mechanical effect of the crack mitigating layer on the glass substrate.

The crack mitigating layer 130 according to one or more embodiments may have a critical strain energy release rate ($G_{IC}=K_{IC}^2/E$) that is greater than the critical strain energy release rate of the film 110. In other examples, the crack mitigating layer may exhibit a critical strain energy release rate that is less than 0.25 times or less than 0.5 times the critical strain energy release rate of the glass substrate. In specific embodiments, the critical strain energy release rate of the crack mitigating layer can be about 0.1 $kJ/m^2$ or less, about 0.09 $kJ/m^2$ or less, about 0.08 $kJ/m^2$ or less, about 0.07 $kJ/m^2$ or less, about 0.06 $kJ/m^2$ or less, about 0.05 $kJ/m^2$ or less, about 0.04 $kJ/m^2$ or less, about 0.03 $kJ/m^2$ or less, about 0.02 $kJ/m^2$ or less, about 0.01 $kJ/m^2$ or less, about 0.005 $kJ/m^2$ or less, about 0.003 $kJ/m^2$ or less, about 0.002 $kJ/m^2$ or less, about 0.001 $kJ/m^2$ or less; but in some embodiments, greater than about 0.0001 $kJ/m^2$ (i.e. greater than about 0.1 $J/m^2$).

The crack mitigating layer 130 may have a refractive index that is greater than the refractive index of the glass substrate 120. In one or more embodiments, the refractive index of the crack mitigating layer 130 may be less than the refractive index of the film 110. In a more specific embodiment, the refractive index of the crack mitigating layer 130 may be between the refractive index of the glass substrate 120 and the film 110. For example, the refractive index of the crack mitigating layer 130 may be in the range from about 1.45 to about 1.95, from about 1.5 to about 1.8, or from about 1.6 to about 1.75. Alternatively, the crack mitigating layer may have a refractive index that is substantially the same as the glass substrate, or a refractive index that is not more than 0.05 index units greater than or less than the glass substrate over a substantial portion of the visible wavelength range (e.g. from 450 to 650 nm).

In one or more embodiments, the crack mitigating layer 130 is able to withstand high temperature processes. Such processes can include vacuum deposition processes such as chemical vapor deposition (e.g., plasma enhanced chemical vapor deposition), physical vapor deposition (e.g., reactive or nonreactive sputtering or laser ablation), thermal or e-beam evaporation and/or atomic layer deposition. In one or more specific embodiments, the crack mitigating layer is able to withstand a vacuum deposition process in which the film 110 and/or other films disposed on the glass substrate 120 are deposited on the crack mitigating layer 130 via vacuum deposition. As used herein, the term "withstand" includes the resistance of the crack mitigating layer 130 to temperatures exceeding 100° C., 200° C., 300° C., 400° C., 500° C., 600° C. and potentially even greater temperatures. In some embodiments, the crack mitigating layer 130 may be considered to withstand the vacuum deposition or temperature treatment process if the crack mitigating layer 130 experiences a weight loss of 10% or less, 8% or less, 6% or less, 4% or less, 2% or less or 1% or less, after deposition of the film 110 and/or other films on the glass substrate (and on the crack mitigating layer 130). The deposition process (or testing after the deposition process) under which the crack mitigating layer experiences weight loss can include temperatures of about 100° C. or greater, 200° C. or greater, 300° C. or greater, 400° C. or greater; environments that are rich in a specific gas (e.g., oxygen, nitrogen, argon etc.); and/or environments in which deposition may be performed under high vacuum (e.g. $10^{-6}$ Torr), under atmospheric conditions and/or at pressures therebetween (e.g., 10 mTorr). As will be discussed herein, the material utilized to form the crack mitigating layer 130 may be specifically selected for its high temperature tolerances (i.e., the ability to withstand high temperature processes such as vacuum deposition processes) and/or its environmental tolerances (i.e., the ability to withstand environments rich in a specific gas or at a specific pressure). These tolerances may include high temperature tolerance, high vacuum tolerance, low vacuum outgassing, a high tolerance to plasma or ionized gases, a high tolerance to ozone, a high tolerance to UV, a high tolerance to solvents, or a high tolerance to acids or bases. In some instances, the crack mitigating layer 130 may be selected to pass an outgassing test according to ASTM E595. In one or more embodiments, the article including the crack mitigating layer 130 may exhibit an improved average flexural strength over articles without the crack mitigating layer 130. In other words, articles that include a glass substrate 120, a film 110 and a crack mitigating layer 130 exhibit greater average flexural strength than articles that include the glass substrate 120 and the film 110 but no crack mitigating layer 130.

In one or more embodiments, the crack mitigating layer 130 may include a plasma-polymerized polymer. Plasma polymerization includes the deposition of a thin polymer film under atmospheric or reduced pressure and plasma excitation (e.g., DC or RF parallel plate, Inductively Coupled Plasma (ICP) Electron Cyclotron Resonance (ECR) downstream microwave or RF plasma), from source gases. Exemplary source gases include fluorocarbon sources (including $CF_4$, $CHF_3$, $C_2F_6$, $C_3F_6$, $C_2F_2$, $CH_3F$, $C_4F_8$, chlorofluoro carbons, or hydrochlorofluoro carbons), hydrocarbons for example alkanes (including methane, ethane, propane, butane), alkenes (including ethylene, propylene), alkynes (including acetylene), and aromatics (including benzene, toluene), hydrogen, and other gas sources for example $SF_6$. Plasma polymerization creates a layer of highly cross-linked material. Control of reaction conditions and source gases can be used to control the film thickness, density, and chemistry to tailor the functional groups to the desired application.

In one or more embodiments, the plasma-polymerized polymer may include one or more of plasma-polymerized fluoropolymer, plasma-polymerized hydrocarbon polymer, plasma-polymerized siloxane polymer and plasma-polymerized silane polymer. Where the plasma-polymerized polymer includes a plasma-polymerized fluorocarbon, such material may be a vacuum-deposited material formed from a polymer forming fluorocarbon source gas(es), as described above, and a fluorinated etchant. Accordingly, the crack mitigating layer may include fluorine in some embodiments. The fluorine can be derived from a fluorine-containing gas (e.g., $CHF_3$, $C_4F_8$, $CF_4$, $C_2F_6$, $C_3F_8$, $NF_3$, and $SF_6$). In such embodiments, the fluorocarbon source gas and fluorinated etchant are flowed sequentially or simultaneously to achieve the desired layer and thickness of layer.

In one or more embodiments, the plasma-polymerized hydrocarbon may include a vacuum-deposited material formed from a volatile gas and optionally hydrogen. The volatile gas can include an alkane ($C_nH_{2n+2}$), an alkene ($C_nH_{2n}$), an alkyne ($C_nH_{2n-2}$), or combinations thereof, where n<8. In embodiments utilizing a plasma-polymerized silane polymer, such material may be vacuum-deposited material and may be formed from a silane source material and optionally an oxidizer. The silane source material may include the formulation $R_xSiX_{4-x}$, where R is an alkyl or aryl organic group and X comprises one of a hydrogen, a halide, or an alkoxy group. The optional oxidizer may include oxygen, ozone, nitrous oxide, carbon dioxide, water vapor, hydrogen peroxide and/or combinations thereof.

In one or more embodiments, the crack mitigating layer 130 may include a silane, which is distinguished from the plasma-polymerized silane polymer. In one or more embodiments, the silane may include a solution-deposited silane and/or vapor-deposited silane, which is formed without the use of plasma. The silane may include an aliphatic silane and/or an aromatic silane. In some embodiments, the silane may include the formulation $R_xSiX_{4-x}$, where R comprises a fluorine, alkyl or optionally-fluorinated or chlorinated aryl organic group and X comprises a halide or an alkoxy group.

In one or more embodiments, the crack mitigating layer may include a metal, such as Al, Cu, Ti, Fe, Ag, Au, or other similar metals and combinations thereof. In some embodiments, very thin metal films (e.g., in the range from about 1 to about 100 nm, from about 1 nm to about 50 nm, and/or from about 1 nm to about 10 nm) can be used to modify the adhesion at one or more interfaces while maintaining relatively high optical transmittance (e.g. greater than 50% or greater than 80% optical transmittance).

In one or more embodiments, the crack mitigating layer 130 may include: porous oxides, such as $SiO_2$, $SiO$, $SiO_x$, $Al_2O_3$; $TiO_2$, $ZrO_2$, $Nb_2O_5$, $Ta_2O_5$, $GeO_2$ and similar material(s) known in the art; porous versions of the films mentioned elsewhere herein, for example porous indium-tin-oxide, porous aluminum-zinc-oxide, or porous fluorinated-tin-oxide; porous nitrides or carbides, for example $Si_3N_4$, AlN, TiN, TiC; porous oxycarbides and oxy-carbo-nitrides, for example $SiC_xO_y$ and $SiC_xO_yN_z$; porous semiconductors such as Si or Ge; porous oxynitrides such as $SiO_xN_y$, $AlO_xN_y$, or $SiAl_xO_yN_z$; porous metals such as Al, Cu, Ti, Fe, Ag, Au, and other metals.

In some cases, the crack mitigating layer 130 includes an inorganic material. The inorganic material can include a metal fluoride (e.g., $CaF_2$, $BaF_2$, $AlF_3$, $MgF_2$, $SrF_2$, $LaF_3$ and lanthanide series trifluorides). In some embodiments, the crack mitigating layer 130 includes two or more metal fluorides. Metal fluorides employed in the crack mitigating layer 130 can be deposited as discrete films on the glass substrate 120 by a variety of methods including but not limited to various vacuum deposition techniques, e.g., e-beam evaporation. Advantageously, the discrete metal fluoride films, and other inorganic materials, employed in crack mitigating layer 130 can be deposited as discrete films in situ with the subsequent deposition of film 110 using such vacuum deposition techniques. Cleanliness can be maintained during such multiple-film deposition sequences. Further, manufacturing time can be reduced by the deposition of multiple films on the glass substrate 120 in a single vacuum chamber.

The inorganic material contained in the crack mitigating layer 130 can also include a reaction product derived at least in part from the glass substrate 120. In some of these embodiments, the crack mitigating layer 130 can be developed through the deposition of a plasma-polymerized polymer on the glass substrate 120 and/or the selective etching of certain glass constituents in the surface of the glass substrate 120 (e.g., at the interface 150). In some cases, the deposition and/or etching is performed using a low pressure plasma treatment (e.g., about 50 mTorr). According to some embodiments, fluorine-containing source gases are employed to develop the plasma-polymerized polymer and/or etch the glass substrate 120 including but not limited to $CHF_3$, $C_4F_8$, $CF_4$, $C_2F_6$, $C_3F_8$, $NF_3$, and $SF_6$.

Figure 10A:
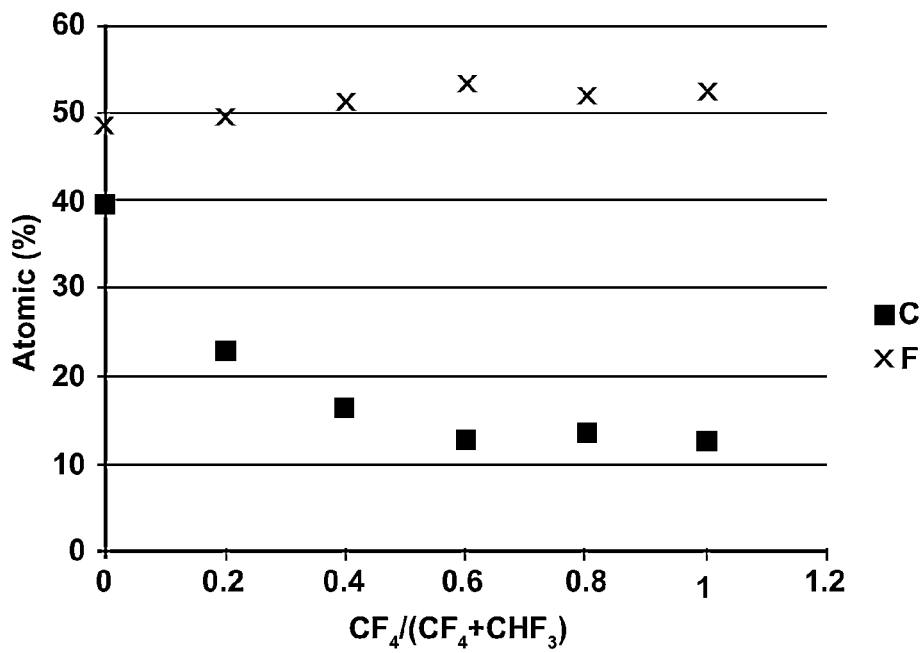
FIG. 10A is a graph of carbon and fluorine x-ray photoelectron spectroscopy ("XPS") data for various plasma-assisted treatments of a glass surface employing fluorine-containing gases according to a further aspect of this disclosure.
Figure 10B:
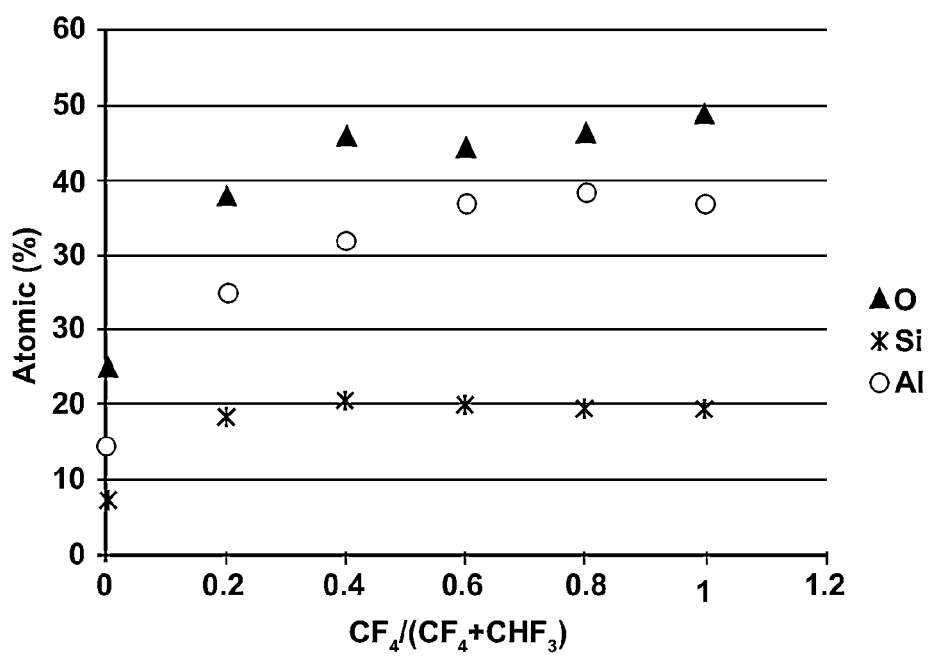
FIG. 10B is a graph of oxygen, silicon and aluminum XPS data for various plasma-assisted treatments of a glass surface employing fluorine-containing gases according to an aspect of this disclosure.

As depicted in FIGS. 10A and 10B, in some exemplary embodiments, the relative ratio between $CHF_3$ and $CF_4$ can be controlled to effect plasma-assisted deposition of the crack mitigating layer 130 and/or etching of the glass substrate 120 to form or develop the crack mitigating layer 130. A high percentage of $CF_4$ (i.e., $CF_4/(CF_4+CHF_3)$ on the x-axis of FIGS. 10A and 10B approaches 1.0 and/or exceeds 1.0) for example, can be employed to effectively etch Si and B from the surface of the glass, while at the same time fluorinating Al, Ca, and Mg, also present at the surface of the glass. The development of these fluorides, and others, can reduce the adhesive energy between the crack mitigating layer 130 and the glass substrate 120 and the film 110. A high percentage of $CHF_3$ (i.e., $CF_4/(CF_4+CHF_3)$ on the x-axis of FIGS. 10A and 10B approaches 0), for example, can be employed to develop a carbon-rich fluoropolymer layer or region at the surface of the glass substrate 120, serving as a crack mitigating layer 130. Indeed, FIG. 10A demonstrates relatively high levels of carbon when pure $CHF_3$ is employed in a plasma-assisted development of crack mitigating layer 130. Moreover, the development of such carbon-rich fluoropolymer films, and other polymeric films, to serve as the crack mitigating layer 130 can also reduce the adhesive energy between layer 130 and the glass substrate 120 and the film 110.

In other embodiments, fluorine-containing etchant gases (e.g., $CF_4$, $C_2F_6$, $C_3F_8$, $NF_3$, and $SF_6$) can be used with plasma-assisted treatments to etch Si and/or B from the $SiO_2$ and $B_2O_3$ present at the surface of the glass substrate 120. At the same time, these etchants can fluorinate the Al, Ca and/or Mg in the $Al_2O_3$, CaO and MgO constituents in the glass substrate 120. The development of these metal fluorides from metal originally contained in the substrate, e.g., $AlF_x$, $CaF_x$ and/or $MgF_x$, and/or local reductions in the amount of $SiO_2$ and $B_2O_3$ in the crack mitigating layer 130 can reduce the overall adhesive energy between the glass substrate 120 and film 110, even after subsequent high temperature treatments. In addition, fluorine-containing polymer forming gases (e.g., $CHF_3$, $C_4F_8$) can be used to develop fluoropolymer films and/or regions at the surface of the glass substrate 120 to form a crack mitigating layer 130. Combinations of these metal fluorides and fluoropolymer films, created via different compositions of such fluorine-containing gases, can also be employed to generate films and/or regions at the surface of the glass substrate 120 that can serve as a crack mitigating layer 130. Crack mitigating layers 130 formed in this fashion also can reduce the overall adhesive energy between the glass substrate 120 and film 110 with limited sensitivity to subsequent thermal processing of the articles containing such substrates and films and/or elevated temperatures associated with the creation of the film 110.

Figure 5B:
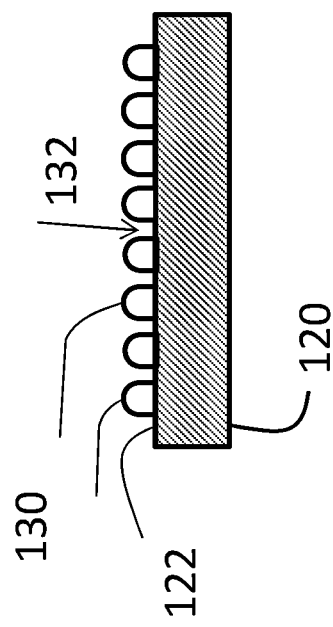
FIG. 5B shows a cross-sectional view of the glass substrate and crack mitigating layer shown in FIG. 5A, taken along lines 1B-1B.
Figure 5C:
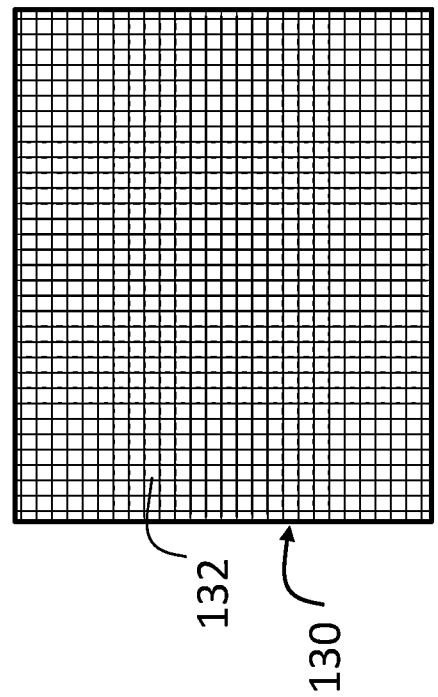
FIG. 5C shows a top view of the glass substrate and an alternative embodiment of the crack mitigating layer shown in FIG. 1, before disposing the film on the crack mitigating layer.
Figure 5A:
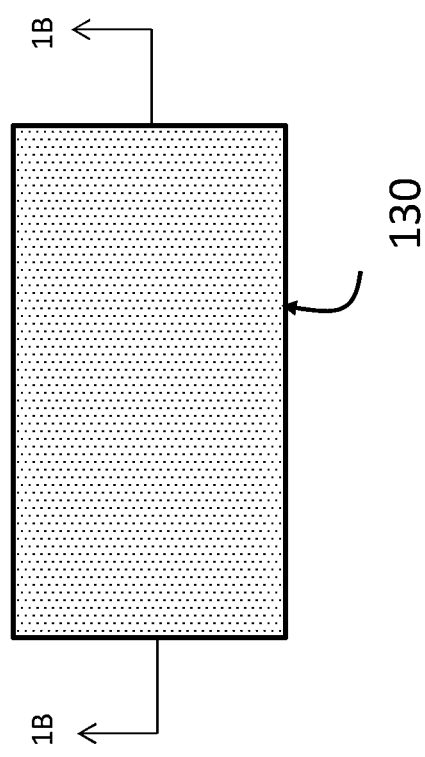
FIG. 5A shows a top view of the glass substrate and an alternative embodiment of the crack mitigating layer shown in FIG. 1, before disposing the film on the crack mitigating layer.

In one or more embodiments, the crack mitigating layer 130 may be a continuous layer or a discontinuous layer. Where the crack mitigating layer is a discontinuous layer, the first opposing surface 122 on which the crack mitigating layer 130 is disposed may include exposed areas 132 (or areas that do not include the crack mitigating layer 130) and areas that include the crack mitigating layer 130, as shown in FIGS. 5A-5C. The pattern of the crack mitigating layer 130 may include discrete islands of the material surrounded by exposed areas 132 (or areas that do not include the crack mitigating layer 130) as shown in FIG. 5B. Alternatively, the crack mitigating layer 130 may form a continuous matrix of material with exposed areas 132 (or areas that do not include the crack mitigating layer 130) surrounded by the crack mitigating layer 130 as shown in FIG. 5C. The crack mitigating layer 130 may cover about 50%, about 60%, about 70%, about 80%, about 90% or about 100% of the area of the first opposing surface 122. The thickness of the crack mitigating layer 130 may be uniform along substantially all of the areas of the first opposing surface on which it is disposed. In one or more alternative embodiments, the thickness of the crack mitigating layer may vary to provide areas of less thickness and areas of greater thickness. The variation in thickness may be present where the crack mitigating layer is continuous or discontinuous.

The crack mitigating layer 130 may be disposed between the film 110 and the glass substrate 120 by a variety of methods. The crack mitigating layer 130 can be disposed using vacuum deposition techniques, for example, chemical vapor deposition (e.g., plasma enhanced chemical vapor deposition, atmospheric pressure chemical vapor deposition, or plasma-enhanced atmospheric chemical vapor deposition), physical vapor deposition (e.g., reactive or nonreactive sputtering, thermal evaporation, e-beam evaporation, or laser ablation), thermal, resistive, or e-beam evaporation and/or atomic layer deposition. The crack mitigating layer 130 of one or more embodiments may exhibit higher temperature tolerance, robustness to UV ozone or plasma treatments, UV transparency, robustness to environmental aging, low outgassing in vacuum, and the like. In instances where the film is also formed by vacuum deposition, both the crack mitigating layer and the film can be formed in the same or similar vacuum deposition chamber or using the same or similar coating equipment.

The crack mitigating layer 130 may also be disposed using liquid-based deposition techniques, for example sol-gel coating or polymer coating methods, for example spin, spray, slot draw, slide, wire-wound rod, blade/knife, air knife, curtain, roller, gravure coating among others and other methods known in the art.

In one or more embodiments, the crack mitigating layer 130 may include a porous layer, or more specifically, a nanoporous layer. As used herein, the term "nanoporous" includes materials with traditionally-defined "pores" (e.g., openings or voids) and also includes materials that are characterized by a lower density or a lower elastic modulus than is expected for fully dense materials having the same or similar chemical composition. Thus, the "pores" in the nanoporous layer may take the form of columnar voids, atomic vacancies, spherical pores, interstices between grains or particles, regions of low or varying density, or any other geometry that leads to a macroscopic decrease in density or elastic modulus for the nanoporous layer. The volume fraction of porosity can be estimated from refractive index measurements using known methods, for materials with nanoscale pores and no light scattering or very low light scattering. In one or more embodiments, the volume fraction of porosity may be greater than about 5%, greater than about 10%, or greater than about 20%. In some embodiments the volume fraction of porosity may be less than about 90%, or less than about 60%, to preserve mechanical durability of the nanoporous layers during handling and end use.

The nanoporous layer may be substantially optically transparent and free of light scattering, for example having an optical transmission haze of 10% of less, 9% or less, 8% or less, 7% or less, 6% or less, 5% or less, 4% or less, 3% or less, 2% or less, 1% or less and all ranges and sub-ranges therebetween. The transmission haze of the nanoporous layer may be controlled by controlling the average sizes of pores, as defined herein. Exemplary average pore sizes in the nanoporous layer may include 200 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less and all ranges and sub-ranges therebetween. These pore sizes can be estimated from light scattering measurements, or directly analyzed using transmission electron microscopy (TEM) and other known methods.

In one or more embodiments, the nanoporous layer in the crack mitigating layer 130 may include an inorganic material. The inorganic material in the nanoporous layer can include a metal and/or fluorine in some cases. According to some embodiments, the inorganic material in the nanoporous layer can include a metal fluoride (e.g., $CaF_2$, $BaF_2$, $AlF_3$, $MgF_2$, $SrF_2$, $LaF_3$, $YF_3$ and lanthanide series trifluorides). The inorganic material contained in the crack mitigating layer (e.g., crack mitigating layer 130) in the form of a nanoporous layer can also include a reaction product derived at least in part from the substrate (e.g., glass substrate 120). In one or more specific embodiments, the crack mitigating layer only includes a nanoporous layer and is nanoporous throughout. The nanoporous layer may include inorganic materials and may, alternatively, exclude organic materials. In one or more embodiments, the crack mitigating layer may include an inorganic nanoporous layer that exhibits low intrinsic film stresses. In specific embodiments, such crack mitigating layers may be formed using techniques that control intrinsic film stresses (e.g., vacuum deposition) in the crack mitigating layer (relative to, for example, some sol-gel coating processes). The control of intrinsic film stresses may also enable control over other mechanical properties such as strain-to-failure of the crack mitigating layer.

Porosity and mechanical properties of the crack mitigating layer can be controlled using careful control of deposition methods such as a slight overpressure of gas in the vacuum chamber, low temperature deposition, deposition rate control, and plasma and/or ion-beam energy modification. Although vapor deposition methods are commonly used, other known methods can be used to provide a crack mitigating layer with the desired porosity and/or mechanical properties. For example, the crack mitigating layer including a nanoporous layer can also be formed by wet-chemistry or sol-gel methods, such as spin coating, dip coating, slot/slit coating, roller coating, gravure coating, and spray coating. Porosity can be introduced to wet-coated nanoporous layers by use of a pore former (such as a block copolymer pore former) which is later dissolved or thermally decomposed, phase separation methods, or the casting of a particulate or nanoparticulate layer where interstices between particles remain partially void.

In some embodiments the nanoporous layer may exhibit a similar refractive index to either the glass substrate and/or film and/or additional layers (as described herein), to minimize optical interference effects. Additionally or alternatively, the nanoporous layer may exhibit a refractive index that is tuned to achieve anti-reflective interference effects. The refractive index of the nanoporous layer can be engineered somewhat by controlling the nanoporosity of the nanoporous layer. For example, in some cases it may be desirable to choose a material with a relatively high refractive index, such as $Al_2O_3$, $TiO_2$, $Nb_2O_5$, $Si_3N_4$, or AlN, which when made into a nanoporous layer with a targeted porosity level can exhibit an intermediate refractive index in the range from about 1.4 to about 1.8 or a refractive index that approximates the glass substrate (e.g., in the range from about 1.45 to about 1.6). The refractive index of the nanoporous layer can be related to the porosity level using "effective index" models that are known in the art.

The thickness (which includes an average thickness where the thickness of the crack mitigating layer varies) of the crack mitigating layer 130 may be in the range of about 0.001 μm to about 10 μm (1 nm to 10,000 nm) or in the range from about 0.005 μm to about 0.5 μm (5 nm to about 500 nm), from about 0.01 μm to about 0.5 μm (10 nm to about 500 nm), from about 0.02 μm to about 0.2 μm (20 nm to about 200 nm); however in some cases the film can be much thinner, for example, the crack mitigating layer 130 may be a single-molecule "monolayer" having a thickness of about 0.1 nm to about 1 nm. In one or more embodiments, the thickness of the crack mitigating layer 130 is in the range from about 0.02 μm to about 10 μm, from about 0.03 μm to about 10 μm, from about 0.04 μm to about 10 lam, from about 0.05 μm to about 10 μm, from about 0.06 μm to about 10 μm, from about 0.07 μm to about 10 μm, from about 0.08 μm to about 10 μm, from about 0.09 μm to about 10 μm, from about 0.1 μm to about 10 μm, from about 0.01 μm to about 9 μm, from about 0.01 μm to about 8 μm, from about 0.01 μm to about 7 μm, from about 0.01 μm to about 6 μm, from about 0.01 μm to about 5 μm, from about 0.01 μm to about 4 μm, from about 0.01 μm to about 3 μm, from about 0.01 μm to about 2 μm, from about 0.01 μm to about 1 micron, from about 0.02 μm to about 1 micron, from about 0.03 to about 1 μm, from about 0.04 μm to about 0.5 μm, from about 0.05 μm to about 0.25 μm or from about 0.05 μm to about 0.15 μm. In one or more specific embodiments, the thickness of the crack mitigating layer may be about 30 nm or less, about 20 nm or less, about 10 nm or less, about 5 nm or less, about 4 nm or less, about 3 nm or less, about 2 nm or less or about 1 nm or less.

In one or more embodiments, thicknesses of the glass substrate 120, film 110 and/or crack mitigating layer 130 may be specified in relation to one another. For example, the crack mitigating layer may have a thickness that is less than or equal to about 10 times the thickness of the film. In another example, where a film 110 has a thickness of about 85 nm, the crack mitigating layer 130 may have a thickness of about 850 nm or less. In yet another example, the thickness of the crack mitigating layer 130 may be in the range from about 35 nm to about 80 nm and the film 110 may have a thickness in the range from about 30 nm to about 300 nm. In one variant, the crack mitigating layer may have a thickness that is less than or equal to about 9 times, 8 times, 7 times, 6 times, 5 times, 4 times, 3 times or two times the thickness of the film. In another variant, the thickness of the film and the thickness of the crack mitigating film are each less than about 10 μm, less than about 5 μm, less than about 2 μm, less than about 1 μm, less than about 0.5 μm, or less than about 0.2 μm. The ratio of the crack mitigating layer 130 thickness to the film 110 thickness may be, in some embodiments, in the range from about 1:1 to about 1:8, in the range from about 1:2 to about 1:6, in the range from about 1:3 to about 1:5, or in the range from about 1:3 to about 1:4. In another variant, the thickness of the crack mitigating layer is less than about 0.1 μm and the thickness of the film is greater than the crack mitigating layer.

One or more embodiments of the article include a crack mitigating layer 130 comprising a plasma-polymerized polymer, a silane, a metal or combinations thereof. In such embodiments, when the crack mitigating layer 130 is utilized, the film 110 maintains functional properties (e.g., optical properties, electrical properties and mechanical properties) and the article 100 retains its average flexural strength. In such embodiments, the film 110 may include one or more transparent conductive oxide layers, such as indium-tin-oxide layers or scratch resistant layer, such as AlOxNy, AlN and combinations thereof. In addition, the glass substrate 120 may be strengthened, or more specifically, chemically strengthened.

Additionally or alternatively, the film 110 including one or more of an indium-tin-oxide layer, a scratch-resistant layer (e.g., AlOxNy, AlN and combinations thereof), an easy-to-clean layer, an anti-reflective layer, an anti-fingerprint layer and the like, and the crack mitigating layer 130 comprising a plasma-polymerized polymer, a silane, a metal or combinations thereof, form a stack, wherein the stack has an overall low optical reflectance. For example, the overall (or total) reflectance of such a stack may be 15% or less, 10% or less, 8% or less, 7% or less, 6.5% or less, 6% or less, 5.5% or less across a visible wavelength range from 450-650 nm, 420-680 nm, or even 400-700 nm. The reflectance numbers above may be present in some embodiments including the reflectance from one bare (or uncoated) glass interface, which is approximately 4% reflectance from the uncoated glass interface alone, or may be characterized as the reflectance for a first major surface of a glass substrate and the films and layers (and associated interfaces) disposed on the first major surface (excluding the 4% reflectance from an uncoated second major surface of the glass substrate). The reflectance from the film stack structure and film-glass coated interfaces alone (subtracting out the reflectance of the uncoated glass interface) may be less than about 5%, 4%, 3%, 2%, or even less than about 1.5% across a visible wavelength range from 450-650 nm, 420-680 nm, or even 400-700 nm, in some cases when one or more major surfaces of the glass substrate is covered by a typical encapsulant (i.e. an additional film or layer) having an encapsulant refractive index of about 1.45-1.65. In addition, the stack structure may exhibit a high optical transmittance, which indicates both low reflectance and low absorptance, according to the general relationship: Transmittance=100%−Reflectance−Absorptance. The transmittance values for the stack structure (when neglecting reflectance and absorptance associated with the glass substrate or encapsulant layers alone) may be greater than about 75%, 80%, 85%, 90%, 95%, or even 98% across a visible wavelength range from 450-650 nm, 420-680 nm, or even 400-700 nm.

One or more embodiments of the article include a crack mitigating layer 130 comprising nanoporous, vapor-deposited $SiO_2$. In such embodiments, when the crack mitigating layer 130 is utilized, the film 110 maintains functional properties (e.g., optical properties, electrical properties and mechanical properties) and the article 100 retains its average flexural strength, or has an improved average flexural strength relative to a similar article comprising film 110 and glass substrate 120 without the crack mitigating layer 130. In such embodiments, the film 110 may include one or more transparent conductive oxide layers, such as indium-tin-oxide layers, a scratch resistant layer, an easy-to-clean layer, an anti-reflective layer, an anti-fingerprint layer and the like. In addition, the glass substrate 120 may be strengthened, or more specifically, chemically strengthened. In these embodiments, use of the crack-mitigating layers described herein may be utilized for some applications because of the temperature, vacuum, and environmental tolerance factors mentioned elsewhere herein.

The optical properties of the article 100 may be adjusted by varying one or more of the properties of the film 110, crack mitigating layer 130 and/or the glass substrate 120. For example, the article 100 may exhibit a total reflectance of 15% or less, 10% or less, 8% or less, 7% or less, 6.9% or less, 6.8% or less, 6.7% or less, 6.6% or less, 6.5% or less, 6.4% or less, 6.3% or less, 6.2% or less, 6.1% or less and/or 6% or less, over the visible wavelength range from about 400 nm to about 700 nm. Ranges may further vary as specified hereinabove, and ranges for the film stack/coated glass interfaces alone are listed hereinabove. In more specific embodiments, the article 100 described herein, may exhibit a lower average reflectance and greater average flexural strength than articles without a crack mitigating layer 130. In one or more alternative embodiments, at least two of optical properties, electrical properties or mechanical properties of the article 100 may be adjusted by varying the thickness(es) of the glass substrate 120, film 110 and/or the crack mitigating layer 130. Additionally or alternatively, the average flexural strength of the article 100 may be adjusted or improved by modifying the thickness(es) of the glass substrate 120, film 110 and/or the crack mitigating layer 130.

The article 100 may include one or more additional films disposed on the glass substrate. In one or more embodiments, the one or more additional films may be disposed on the film 110 or on the opposite major surface from the film. The additional film(s) may be disposed in direct contact with the film 110. In one or more embodiments, the additional film(s) may be positioned between: 1) the glass substrate 120 and the crack mitigating layer 130; or 2) the crack mitigating layer 130 and the film 110. In one or more embodiments, both the crack mitigating layer 130 and the film 110 may be positioned between the glass substrate 120 and the additional film(s). The additional film(s) may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers and combinations thereof, and other layers known in the art to perform these or related functions. Examples of suitable protective or barrier layers include layers containing $SiO_x$, $SiN_y$, $SiO_xN_y$, other similar materials and combinations thereof. Such layers can also be modified to match or complement the optical properties of the film 110, the crack mitigating layer 130 and/or the glass substrate 120. For example, the protective layer may be selected to have a similar refractive index as the crack mitigating layer 130, the film 110, or the glass substrate 120. It will be apparent to those of ordinary skill in the art that multiple additional film(s) with varying refractive indices and/or thicknesses can be inserted for various reasons. The refractive indices, thicknesses and other properties of the additional films (as well as the crack mitigating layer 130 and the film 110) may be further modified and optimized, without departing from the spirit of the disclosure. In other cases, for example, alternate film designs can be employed where the crack mitigating layer 130 may have a higher refractive index than the film.

In one or more embodiments, the articles 100 described may be used in information display devices and/or touch-sensing devices. In one or more alternative embodiments, the article 100 may be part of a laminate structure, for example as a glass-polymer-glass laminated safety glass to be used in automotive or aircraft windows. An exemplary polymer material used as an interlayer in these laminates is PVB (Polyvinyl butyral), and there are many other interlayer materials known in the art that can be used. In addition, there are various options for the structure of the laminated glass, which are not particularly limited. The article 100 may be curved or shaped in the final application, for example as in an automotive windshield, sunroof, or side window. The thickness of the article 100 can vary, for either design or mechanical reasons; for example, the article 100 can be thicker at the edges than at the center of the article. The article 100 may be acid polished or otherwise treated to remove or reduce the effect of surface flaws.

A second aspect of the present disclosure pertains to cover glass applications that utilize the articles described herein. In one or more embodiments, the cover glass may include a laminated article with a glass substrate 120 (which may be strengthened or not strengthened), a scratch-resistant film including hard material(s) such as $AlO_xN_y$, AlN, $SiO_xN_y$, $SiAl_vO_xN_y$, $Si_3N_4$ and combinations thereof, and the crack mitigating layer 130. The laminated article may include one or more additional film(s) for reducing the reflection and/or providing an easy to clean or anti-fingerprint surface on the laminated article.

Another aspect of the present disclosure pertains to touch-sensing devices including the articles described herein. In one or more embodiments, the touch sensor device may include a glass substrate 120 (which may be strengthened or not strengthened), a film 110 comprising a transparent conductive oxide and a crack mitigating layer 130. The transparent conductive oxide may include indium-tin-oxide, aluminum-zinc-oxide, fluorinated tin oxide, or others known in the art. In one or more embodiments, the film 110 is discontinuously disposed on the glass substrate 120. In other words, the film 110 may be disposed on discrete regions of the glass substrate 120. The discrete regions with the film form patterned or coated regions (not shown), while the discrete regions without the film form unpatterned or uncoated regions (not shown). In one or more embodiments, the patterned or coated regions and unpatterned or uncoated regions are formed by disposing the film 110 continuously on a surface of the glass substrate 120 and then selectively etching away the film 110 in the discrete regions so that there is no film 110 in those discrete regions. The film 110 may be etched away using an etchant such as HCl or $FeCl_3$ in aqueous solutions, such as the commercially available TE-100 etchant from Transene Co. In one or more embodiments, the crack mitigating layer 130 is not significantly degraded or removed by the etchant. Alternatively, the film 110 may be selectively deposited onto discrete regions of a surface of the glass substrate 120 to form the patterned or coated regions and unpatterned or uncoated regions.

In one or more embodiments, the uncoated regions have a total reflectance that is similar to the total reflectance of the coated regions. In one or more specific embodiments, the unpatterned or uncoated regions have a total reflectance that differs from the total reflectance of the patterned or coated regions by about 5% or less, 4.5% or less, 4% or less, 3.5% or less, 3% or less, 2.5% or less, 2.0% or less, 1.5% or less or even 1% or less across a visible wavelength in the range from about 450 nm to about 650 nm, from about 420 nm to about 680 nm or even from about 400 nm to about 700 nm.

In accordance with another aspect of the present disclosure, articles 100 including both a crack mitigating layer 130 and a film 110, which may include indium-tin-oxide or other transparent conductive oxides, exhibit resistivity that is acceptable for use of such articles in touch sensing devices.

In one or more embodiments, the films 110, when present in the articles disclosed herein, exhibit a sheet resistance of about 100 ohm/square or less, 80 ohm/square or less, 50 ohm/square or less, or even 30 ohm/square or less. In such embodiments, the film may have a thickness of about 200 nm or less, 150 nm or less, 100 nm or less, 80 nm or less, 50 nm or less or even 35 nm or less. In one or more specific embodiments, such films, when present in the article, exhibit a resistivity of $10 \times 10^{-4}$ ohm-cm or less, $8 \times 10^{-4}$ ohm-cm or less, $5 \times 10^{-4}$ ohm-cm or less, or even $3 \times 10^{-4}$ ohm-cm or less. Thus, the films 110, when present in the articles 100 disclosed herein can favorably maintain the electrical and optical performance expected of transparent conductive oxide films and other such films used in touch sensor applications, including projected capacitive touch sensor devices.

The disclosure herein can also be applied to articles which have articles that are not interactive or for display; for example, such articles may be used in a case in which a device has a glass front side that is used for display and can be interactive, and a back side that might be termed "decorative" in a very broad sense, meaning that backside can be "painted" some color, have art work or information about the manufacturer, model and serial number, texturing or other features.

Another aspect of the present disclosure pertains to a method of forming an article 100. In one or more embodiments, such methods include providing a glass substrate 120, disposing a film 110 on a first major surface of the glass substrate to create an effective interface therebetween and controlling the effective adhesion energy of the effective interface. In one or more embodiments, the method includes controlling the effective adhesion energy to less than about 4 J/m². In one or more embodiments, controlling the effective adhesion energy includes disposing a crack mitigating layer 130 on a surface (e.g., one or more of the major surfaces 122, 124 and/or one or more minor surfaces) of the glass substrate 120 before disposing the film. In other words, controlling the effective adhesion energy includes disposing a crack mitigating layer 130 between the film 110 and the glass substrate 120.

In the method of forming an article 100, the crack mitigating layer 130 can include fluorine and, in some cases, may further include a metal. According to some embodiments, the crack mitigating layer 130 includes a metal fluoride. The crack mitigating layer 130 can also include an inorganic metal fluoride compound that contains the fluorine. In some embodiments, the fluorine can be derived from one or more fluorine-containing gases (e.g., $CHF_3$, $C_4F_8$, $CF_4$, $C_2F_6$, $C_3F_8$, $NF_3$, and $SF_6$). According to some other embodiments of the method of forming an article 100, the step for controlling the effective adhesion energy of the interface can include a step for effecting a reaction between the fluorine-containing gas and the substrate (e.g., glass substrate 120) such that the metal in the crack mitigating layer 130 is derived at least in part from the substrate.

In one or more embodiments, the method includes disposing the film 110 and/or the crack mitigating layer 130 via a vacuum deposition process. In particular embodiments, such vacuum deposition processes may utilize temperatures of at least about 100° C., 200° C., 300° C., 400° C. and all ranges and sub-ranges therebetween. In some embodiments, the crack mitigating layer 130 may be formed by a wet process.

In one or more specific embodiments, the method includes controlling the thickness(es) of the crack mitigating layer 130 and/or the film 110. Controlling the thickness(es) of the crack mitigating layer and/or films disclosed herein may be performed by controlling one or more processes for forming the crack mitigating layer and/or films so that the crack mitigating layer and/or films are applied having a desired or defined thickness. In an even more specific embodiment, the method includes controlling the thickness(es) of the crack mitigating layer 130 and/or the film 110 to maintain the average flexural strength of the glass substrate 120 and/or the functional properties of the film 110.

In one or more alternative embodiments, the method includes controlling the continuity of the crack mitigating layer 130 and/or the film. Controlling the continuity of the crack mitigating layer 130 may include forming a continuous crack mitigating layer and removing a selected portion(s) of the crack mitigating layer to create a discontinuous crack mitigating layer. In other embodiments, controlling the continuity of the crack mitigating layer may include selectively forming the crack mitigating layer to form a discontinuous crack mitigating layer. Such embodiments may use a mask, an etchant and combinations thereof to control the continuity of the crack mitigating layer.

In one or more alternative embodiments, the method includes controlling the surface energy of the crack mitigating layer 130 when it is disposed on the glass substrate 120, but before deposition of the film 110. Controlling the surface energy of the crack mitigating layer at this intermediate stage of fabrication may be useful for establishing a repeatable fabrication process. In one or more embodiments, the method includes controlling the surface energy of the crack mitigating layer 130 (as measured when the crack mitigating layer 130 is uncovered and exposed to air) to less than about 70 mJ/m² or less, 60 mJ/m² or less, 50 mJ/m² or less, 40 mJ/m² or less, 30 mJ/m² or less, 20 mJ/m² or less, but in some cases, greater than about 15 mJ/m². In one or more embodiments, the foregoing surface energy values and ranges include both polar and dispersion components and may be measured by fitting a known theoretical model developed by S. Wu (1971) to three contact angles of three test liquids; water, diodomethane and hexadecane. (Reference: S. Wu, *J. Polym. Sci C*, 34, 19, 1971).

In one or more embodiments, the method may include creating porosity in the crack mitigating layer 130. The method may optionally include controlling the porosity of the crack mitigating layer as otherwise described herein. The method may further include controlling the intrinsic film stresses of the crack mitigating layer and/or the film through control of deposition and fabrication processes of the crack mitigating layer.

The method may include disposing an additional film, as described herein, on the glass substrate 120. In one or more embodiments, the method may include disposing the additional film on the glass substrate such that the additional film is disposed between the glass substrate 120 and the crack mitigating layer 130, between the crack mitigating layer 130 and the film 110 or, such that the film 110 is between the crack mitigating layer 130 and the additional film. Alternatively, the method may include disposing the additional film on the opposite major surface of the glass substrate 120 from the surface on which the film is disposed.

In one or more embodiments, the method includes strengthening the glass substrate 120 before or after disposing the crack mitigating layer 130, film 110 and/or an additional film on the glass substrate. The glass substrate 120 may be strengthened chemically or otherwise. The glass substrate 120 may be strengthened after disposing the crack mitigating layer 130 on the glass substrate 120 but before disposing the film 110 on the glass substrate. The glass substrate 120 may be strengthened after disposing the crack mitigating layer 130 and the film 110 on the glass substrate 120 but before disposing an additional film (if any) on the glass substrate. Where no additional film is utilized, the glass substrate 120 may be strengthened after disposing the crack mitigating layer 130 and the film 110 on the glass substrate.

The following examples represent certain non-limiting embodiments of the disclosure.

Examples 1A-1E

Examples 1A-1E were formed by providing glass substrates that included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO_2$≤1 mol %. The glass substrates had a thickness of 0.7 mm. The glass substrates were strengthened by ion exchange to provide a surface compressive stress (CS) of about 690 MPa and a compressive depth of layer (DOL) of about 24 μm. The ion-exchange process was carried out by immersing the glass substrate in a molten potassium nitrate ($KNO_3$) bath that was heated to a temperature in the range from about 350° C. to 450° C. The glass substrates were immersed in the bath for a duration of 3-8 hours to achieve the surface CS and compressive DOL. After completing the ion exchange process, the glass substrates of Examples 1A-1E were cleaned in a 2% concentration KOH detergent solution, supplied by Semiclean KG, having a temperature of about 50° C.

A crack mitigating layer including a plasma-polymerized fluoropolymer was disposed on the strengthened glass substrates of Examples 1C-1E using an ICP chamber. The crack mitigating layer was deposited in a 60 second deposition process at a temperature of about 25° C. using a mixture of $C_4F_8$ gas and $H_2$ gas flowed at 40 sccm and 20 sccm, respectively, at a pressure of about 5 mT, with 1500 W 13.56 MHz RF on the coil and 50 W 13.56 MHz RF on the platen. Prior to combination with a film, the surface energy of the crack mitigating layer was measured in the range from about 19 mJ/m² to about 24 mJ/m². The surface energy was measured by using contact angle measurements using DI water, hexadecane and diodomethane. A film including Cr was disposed on each of Examples 1B-1E using an e-beam evaporation process. Comparative Example 1A did not include a crack mitigating layer or a film and Comparative Example B included a film but no crack mitigating layer. Prior to deposition of the film on Examples 1C-1E, each of Examples 1A-1E was heated to about 120° C. under a pressure of about 2×10⁻⁷ torr and thereafter cooled to room temperature. The thickness measurements provided in Table 1 were measured by spectroscopic ellipsometry.

TABLE 1

Examples 1A-1E.

| Example | Crack Mitigating Layer Thickness | Film Thickness |
|---|---|---|
| 1A (comparative) | None | None |
| 1B (comparative) | none | 30 nm |
| 1C | 6 nm | 30 nm |
| 1D | 6 nm | 30 nm |
| 1E | 6 nm | 30 nm |

Figure 6:
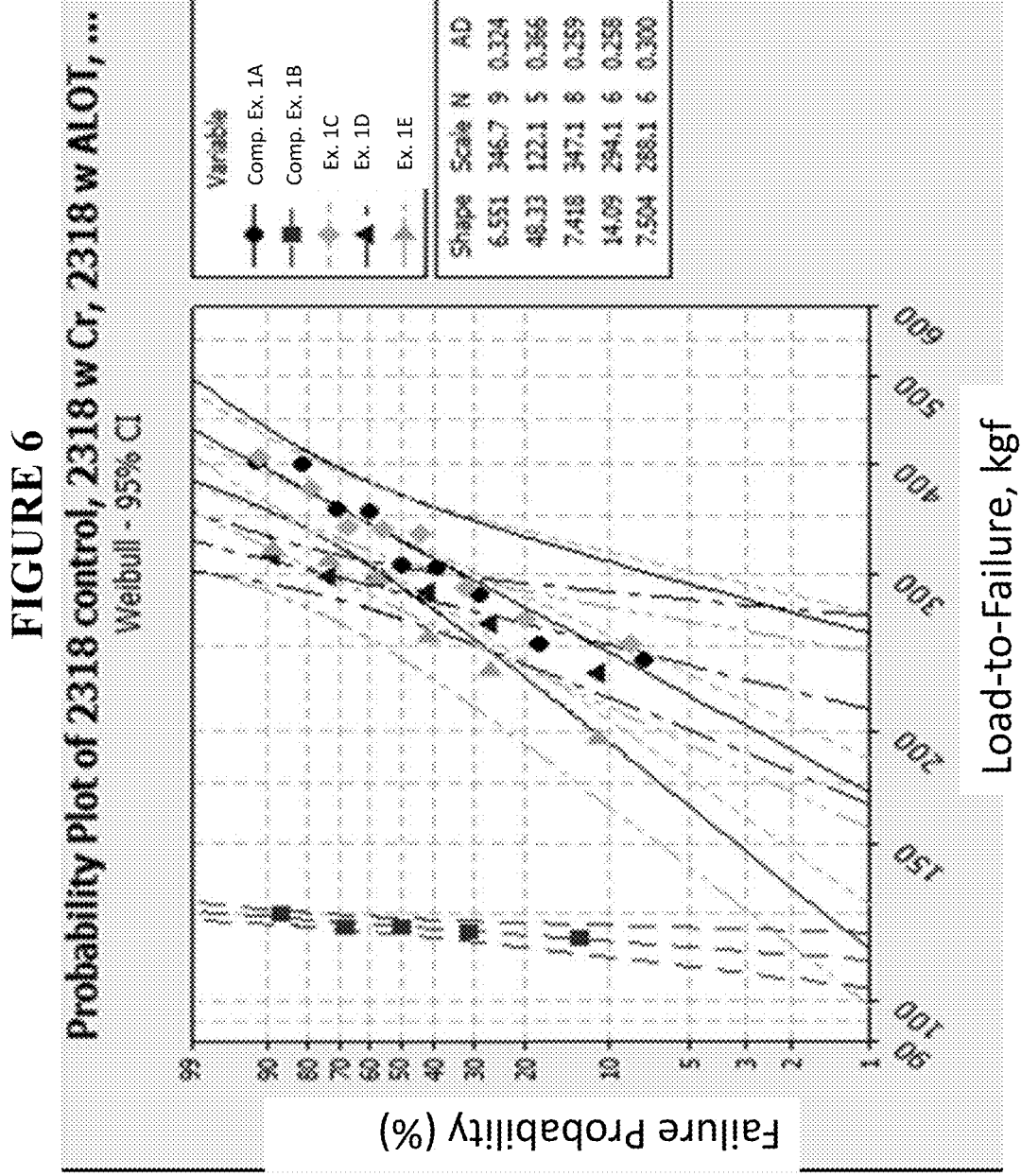
FIG. 6 is a graph presenting ring-on-ring load-to-failure performance of glass substrates or articles according to an aspect of this disclosure given by Examples 1A-1E.

Ring-on-ring load to failure testing was used to demonstrate the retention of average flexural strength of Examples 1A-1E, as shown in FIG. 6. For ring-on-ring load to failure testing, the side with the film and/or crack mitigating layer was in tension. The ring-on-ring load to failure testing parameters included a contact radius of 1.6 mm, a crosshead speed of 1.2 mm/minute, a load ring diameter of 0.5 inches, and a support ring diameter of 1 inch. Before testing, an adhesive film was placed on both sides of the sample being tested to contain broken glass shards.

As illustrated in FIG. 6, the addition of a crack mitigating layer resulted in articles that retained about the same average flexural strength as glass substrates without a crack mitigating layer or film (Comparative Example 1A). Moreover, the articles with a crack mitigating layer exhibited greater average flexural strength than the strengthened and non-strengthened glass substrates with only a film and no crack mitigating layer (i.e. Comparative Example 1B) which exhibited a substantial reduction in the average flexural strength.

Example 2: Nanoporous Crack Mitigating Layer

Examples 2A-2G were made by providing 0.7 mm thick ion-exchange strengthened aluminosilicate glass substrates. The glass substrate included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO_2$≤1 mol %. The glass substrates were ion-exchanged in a $KNO_3$ molten salt bath having a temperature of about 350-450° C. for 3-8 hours. The ion-exchanged glass substrates had a compressive stress of about 687 MPa and an ion-exchange depth of layer of about 24 microns. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

The glass substrate of Example 2A was left bare, with no layers or films disposed thereon. A nanoporous $SiO_2$ layer was deposited on each of the glass substrates of Examples 2B, 2C, 2F and 2G using resistive thermal evaporation of a SiO precursor material at a deposition rate of 5 angstroms/second, a deposition pressure of 7.3×10⁻⁴ Torr, an oxygen flow rate of 100 sccm, an argon flow rate of 100 sccm, and a substrate temperature of initially about 25° C., which increased up to about 50° C. during deposition, due to the heat generated by the deposition process. The resulting nanoporous $SiO_2$ layer had a refractive index of 1.38 at 550 nm wavelength which leads to an estimated porosity of 21%. The nanoporous $SiO_2$ layer was measured to have an elastic modulus of 20 GPa using nanoindentation. Examples 2B and 2F included a nanoporous $SiO_2$ layer having a thickness of about 200 nm and Examples 2C and 2G included a nanoporous $SiO_2$ layer having a thickness of about 500 nm.

The glass substrates of Example 2D-2E (which did not include a nanoporous layer) and Examples 2F and 2G (which each included a nanoporous layer) were further coated with an indium-tin-oxide (ITO) film having a thickness of about 100 nm. The ITO films were formed using a sputtering process and a KDF, model 903i, ITO coating system. A sputtering target of $SnO_2$:In2O3=10:90 (by weight), also supplied by KDF was utilized. The ITO films were sputtered at a pressure of 15 mtorr with 5 sccm flow of 90:10 mixed Ar:$O_2$, 95 sccm Ar flow, and 1000 W DC power. After deposition, Examples 2E-2G were annealed at 200 C for 60 min in air. Example 2D was not annealed. Table 2 summarizes the attributes and processing of Examples 2A-2G.

TABLE 2

Examples 2A-2G.

| Example | Nanoporous SiO$_2$ Layer Thickness | ITO Film Thickness | Annealing Temperature | Annealing Time |
|---|---|---|---|---|
| Example 2A (comparative) | None | None | N/A | N/A |
| Example 2B (comparative) | 200 nm | None | N/A | N/A |
| Example 2C (comparative) | 500 nm | None | N/A | N/A |
| Example 2D (comparative) | None | 100 nm | None | N/A |
| Example 2E (comparative) | None | 100 nm | 200° C. | 60 min |
| Example 2F | 200 nm | 100 nm | 200° C. | 60 min |
| Example 2G | 500 nm | 100 nm | 200° C. | 60 min |

Figure 7:
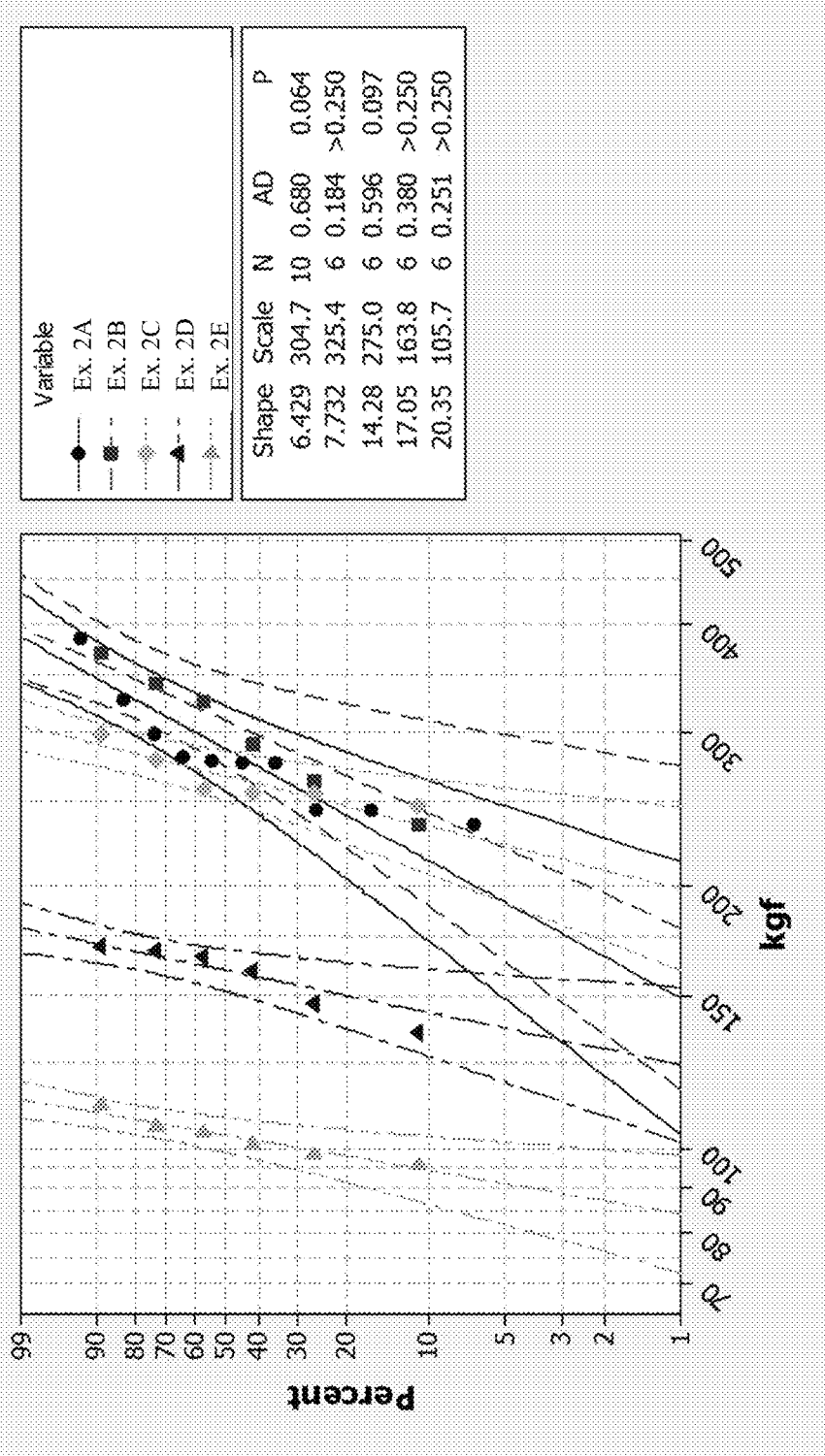
FIG. 7 is a graph presenting ring-on-ring load-to-failure performance of glass substrates or articles according to an aspect of this disclosure given by Examples 2A-2E.
Figure 8:
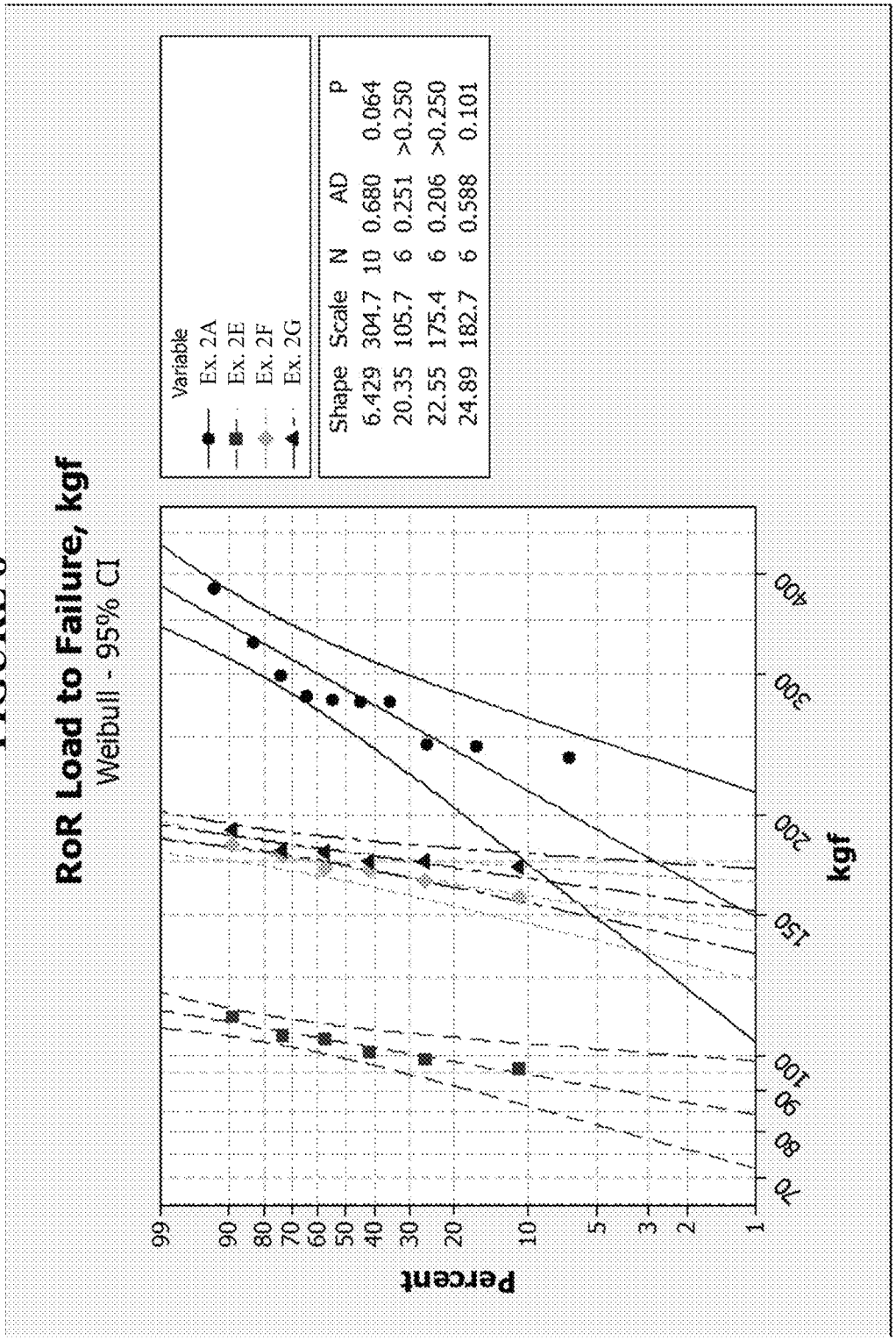
FIG. 8 is a graph presenting ring-on-ring load-to-failure performance of glass substrates or articles according to as aspect of this disclosure given by Examples 2A and 2F-2H.

The average flexural strength of Examples 2A-2G was evaluated in the same manner as Examples 1A-1E. As shown in FIGS. 7 and 8, Examples 2F and 2G (which each included a vapor-deposited nanoporous SiO$_2$ layer disposed between the glass substrate and the ITO film) exhibited improved strength over Examples 2D and 2E (which included only an ITO film). Example 2D and 2E also exhibited a substantial reduction in the average flexural strength over Example 2A (which was a bare glass substrate). Examples 2B and 2C, which included no ITO film exhibited about the same average flexural strength as Example 2A, indicating the nanoporous SiO$_2$ layer did not degrade the strength of the glass substrate.

Examples 2D, which included 100 nm ITO film alone and was annealed, lowered the Weibull characteristic strength of the article to about 106 kgf. The addition of the 200-500 nm nanoporous SiO$_2$ layer between the glass substrate and 100 nm ITO film (with the same annealing cycle), in Examples 2F and 2G, increased the characteristic flexural strength to 175-183 kgf.

In experimental screening, the ITO films deposited on top of the nanoporous SiO$_2$ layers exhibited comparable resistivity levels as the ITO films deposited directly on the glass substrate (with no intervening nanoporous SiO$_2$ layer). Sheet resistance ranged from 35-95 ohms/square for Examples 2D-2G (which corresponds to resistivity less than about $10 \times 10^{-4}$ ohm-cm).

Example 3: Nanoporous Inorganic Crack Mitigating Layer with Aluminum Oxynitride Film Examples 3A-3B were made by providing 1.0 mm thick ion-exchange strengthened aluminosilicate glass substrates. The glass substrate included a composition of 61 mol %≤SiO$_2$≤75 mol %; 7 mol %≤Al$_2$O$_3$≤15 mol %; 0 mol %≤B$_2$O$_3$≤12 mol %; 9 mol %≤Na$_2$O≤21 mol %; 0 mol %≤K$_2$O≤4 mol %; 0 mol %≤MgO≤7 mol %; 0 mol %≤CaO≤3 mol %, and 0 mol %≤SnO2≤1 mol %. The glass substrates were ion-exchanged in a KNO$_3$ molten salt bath having a temperature of about 350-450° C. for 3-8 hours to provide strengthened glass substrates. The strengthened glass substrates had a compressive stress of about 885 MPa and an ion-exchange depth of layer of about 42 microns. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

Five glass substrates of Comparative Example 3A were left bare, with no layers or films disposed thereon. A nanoporous SiO$_2$ layer was deposited on five glass substrates of Example 3B in a vacuum chamber using resistive thermal evaporation of a SiO precursor material at a deposition rate of 5 angstroms/second, a deposition pressure of $9.0 \times 10^{-4}$ Torr, an oxygen flow rate of 150 sccm, an argon flow rate of 100 sccm, and a substrate temperature of initially about 25° C., which increased up to about 50° C. during deposition, due to the heat generated by the deposition process. The five samples of Example 3B were then further coated with 2000 nm thick AlO$_x$N$_y$ films by DC reactive sputtering from an aluminum target at a pressure of about 0.75 mTorr in the presence of argon flowed at a rate of 115 sccm, nitrogen flowed at a rate of 50 sccm and oxygen flowed at a rate of 4 sccm. DC power was supplied at 4000 W. The AlO$_x$N$_y$ film was formed at a deposition rate of about 70 angstroms/minute. Table 3 summarizes the attributes and average strength values of Examples 3A-3B. As can be seen in Table 3, the average strength of the uncoated glass samples (Comparative Example 3A) from this set was about 330 kgf, in this case calculated as a mean value of the five tested samples in terms of RoR load to failure. The average strength of the samples of Example 3B was about 391 kgf. Considering the standard deviations of the average strength values, one of ordinary skill in the art can readily understand that the strength distributions of these two samples sets (Comparative Example 3A and Example 3B) are statistically similar, or substantially the same. Weibull distribution analysis yields a similar statistical conclusion. As illustrated by Comparative Example 2B, similar 2000 nm thick AlO$_x$N$_y$ films disposed directly onto similar glass substrates yielded RoR average load to failure values of about 140-160 kgf. Thus, the crack mitigating layer of Example 3B led to a substantial improvement in the coated glass strength, relative to the same or substantially identical articles made without the crack mitigating layer.

TABLE 3

Examples 3A-3B.

| Example | Nanoporous SiO$_2$ Layer Thickness | AlO$_x$N$_y$ Film Thickness | Average Strength (Mean Load to Failure in RoR, kgf) | Std. Deviation of Load to Failure, kgf |
|---|---|---|---|---|
| Example 3A (comparative) | None | None | 330 | 28.1 |
| Example 3B | 2000 nm | 2000 nm | 391 | 71.5 |

Example 4: Crack Mitigating Layer Developed from Etchant Gas

Examples 4A-4B3 were made by providing 0.7 mm thick glass substrates that are commercially available under the trademark Eagle XG®, from Corning Incorporated. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried. Thereafter, the substrate was exposed to an oxygen plasma generated by Branson ICP, for 300 seconds at 1.2 torr, 300 sccm of oxygen flowed at 500 W.

The glass substrates of Example 4A were left bare, with no layers or films disposed thereon. The glass substrates of Examples 4B1-4B3 included a crack mitigating layer developed by plasma-assisted exposure to a $CF_4$ etchant gas in an ICP chamber at a pressure of approximately 50 mTorr. The crack mitigating layers were developed on the glass substrates of Examples 4B1-4B3 by 6 s, 60 s, and 600 s exposure to the $CF_4$ etchant, respectively.

Figure 11:
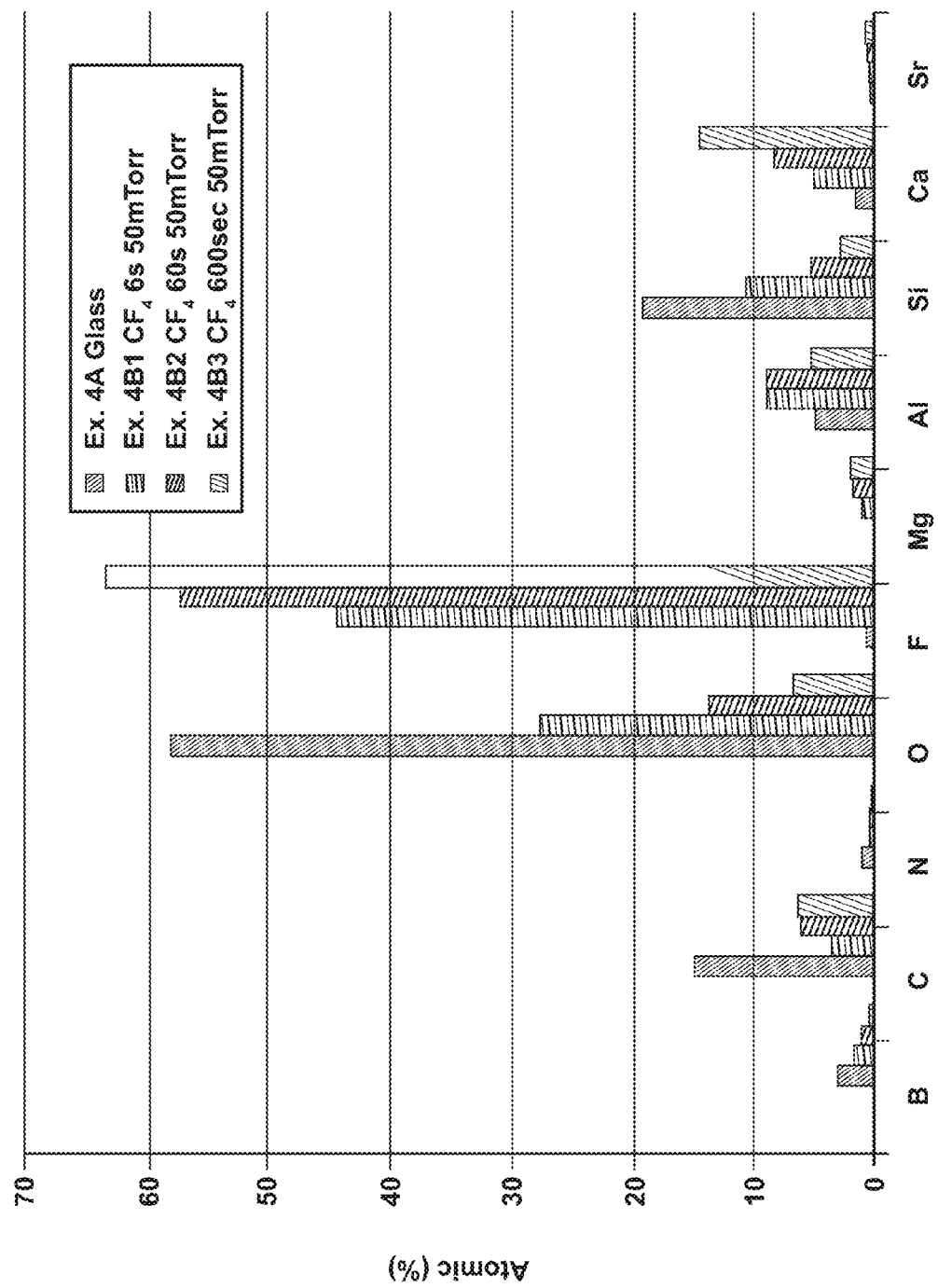
FIG. 11 is a graph of XPS data for a control glass and glass subjected to plasma-assisted treatments employing an etching gas (carbon tetrafluoride) according to an aspect of this disclosure.

The surfaces of the glass substrates of Examples 4A-4B3 were measured using XPS to assess surface composition. The results of the XPS measurements are depicted in FIG. 11. Example 4A, serving as the control, demonstrates relatively high levels of boron, oxygen, and silicon, indicative of the substrate glass composition containing appreciable amounts of $SiO_2$ and $B_2O_3$. As shown by FIG. 11, the glass substrates etched with $CF_4$, Examples 4B1-4B3, demonstrate progressively lower levels of oxygen, silicon and boron with increasing etchant exposure times. In addition, the fluorine, calcium and magnesium levels increase in these samples as a function of etchant exposure times. Together, this data demonstrates that plasma-assisted etching of these glass substrates with $CF_4$ has fluorinated the surface of these substrates, leaving $AlF_x$, $CaF_x$ and $MgF_x$ compounds and preferentially removing $SiO_2$ and $B_2O_3$ from the surface. These $AlF_x$, $CaF_x$ and $MgF_x$ metal fluorides make up the crack mitigating layer developed on these glass substrates.

Example 5: Adhesive Energies of Glass Substrates with Crack Mitigating Layers Developed Through Plasma-Assisted Fluorination Examples 5A1-5A3 were made by providing the same glass substrates as were used in Example 4. Eagle XG glass. The glass substrates were then cleaned as provided above in Example 4.

The glass substrates of Example 5A1 included a crack mitigating layer developed by plasma-assisted exposure to a $CF_4$ etchant gas in an ICP chamber at a pressure of approximately 50 mTorr. Carbon coverage of the substrates of Example 5A1 was measured at approximately 22%. The glass substrates of Examples 5A2 included a crack mitigating layer developed by plasma-assisted exposure to a 30 parts $CF_4$ etchant gas and 10 parts $C_4F_8$ polymer-forming gas in an ICP chamber at a pressure of approximately 50 mTorr. Carbon coverage of the substrates of Example 5A2 was measured at approximately 79%, evidencing the formation of a fluorocarbon polymer layer on the surface of the glass substrate. Finally, the glass substrates of Example 5A3 included a crack mitigating layer developed by plasma-assisted exposure to a $CF_4$ etchant gas in an RIE chamber at a pressure of approximately 50 mTorr. Carbon coverage of the substrates of Example 5A3 was measured at approximately 9%.

Figure 12:
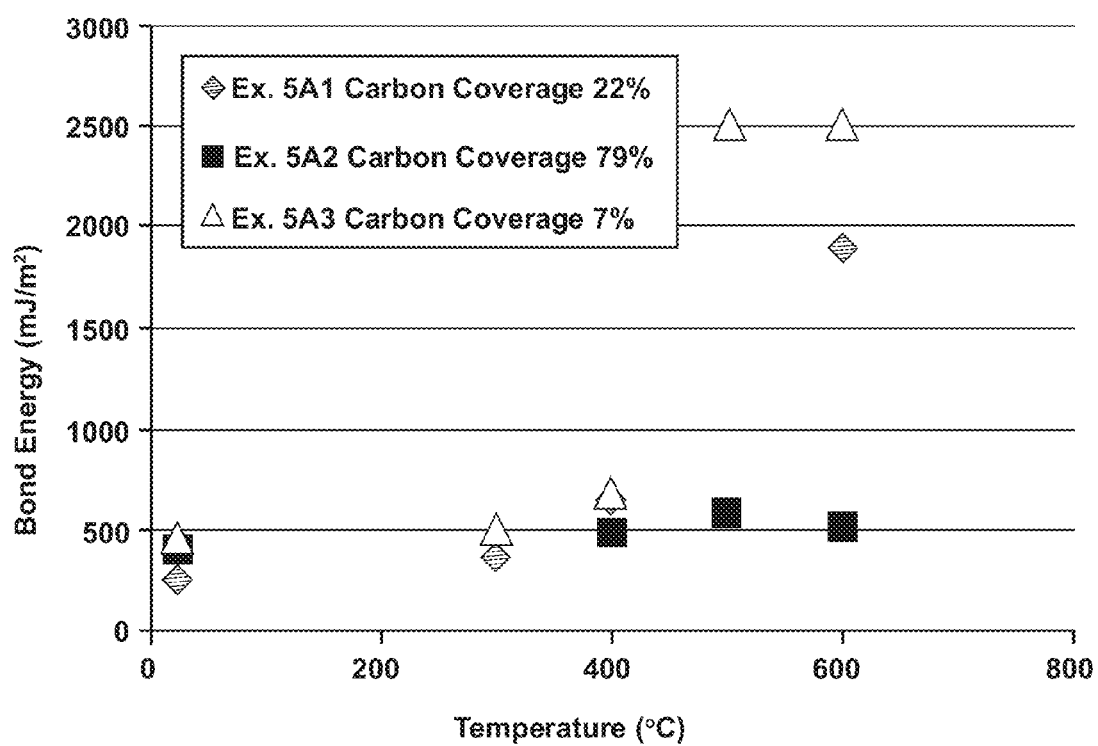
FIG. 12 is a graph of adhesion energy as a function of temperature for glass surfaces subjected to various plasma-assisted treatments employing fluorine-containing gases, as bonded to another glass surface, according to an aspect of this disclosure.

The glass substrates of Examples 5A1-5A3 with crack mitigating layers formed via plasma-assisted fluorination (i.e., carriers) were then bonded to glass substrates comparable in composition to the carrier substrate. These laminated articles were then subjected to testing commensurate with Equation (11) to obtain adhesive energies indicative of the adhesive strength of the crack mitigating layers. The results of these measurements are depicted in FIG. 12 as a function of annealing temperature. This comparison provides an indication of the adhesive energy after exposure to typical post-processing temperatures. In particular, some of the treated substrates of Examples 5A1-A3 were subjected to annealing at various temperatures for 10 minutes to simulate elevated temperatures associated with film deposition over the crack mitigating layer and/or thermal processing associated with post-manufacturing thermal processing of the substrate associated with a particular application. As the results demonstrate, all samples demonstrate relatively moderate adhesive energies of approximately 500 mJ/m² or less up to 400° C., indicative of crack mitigating layers that will aid in the retention of glass substrate strength. Further, the Example 5A2 sample containing the fluorocarbon layer demonstrates no detrimental increase in adhesive energy up to 600° C.

Example 6: Adhesive Energies of Glass, Alumina and Silica Surfaces with Crack Mitigating Layers Developed Through Plasma-Assisted Fluorination and Metal Fluoride Deposition Examples 6A1-A3, 6B and 6C were made by providing the same substrates as Examples 4 and 5. The substrates were cleaned in the same manner as Examples 4 and 5.

The glass substrates of Example 6A1 included a crack mitigating layer developed by plasma-assisted exposure to a $CF_4$ etchant gas in an ICP chamber at a pressure of approximately 50 mTorr. The surface of the glass substrates of Example 6A2 was first modified by the deposition of a $SiO_2$ layer before a crack mitigating layer was developed by plasma-assisted exposure to a $CF_4$ etchant gas in an ICP chamber at a pressure of approximately 50 mTorr. The $SiO_2$ layer (about 100-130 nm thickness) was developed by plasma-enhanced chemical vapor deposition ("PECVD"). Similarly, the surface of the glass substrates of Example 6A3 was first modified with the deposition of an $Al_2O_3$ layer before a crack mitigating layer was developed by plasma-assisted exposure to a $CF_4$ etchant gas in an ICP chamber at a pressure of approximately 50 mTorr. The $Al_2O_3$ layer (about 3 nm thickness) was developed by reactive sputtering. Finally, the glass substrates of Examples 6B and 6C each included a crack mitigating layer of $CaF_2$ and $MgF_2$, respectively, developed by e-beam evaporation. The $CaF_2$ and $MgF_2$ layers were each set to a thickness of about 20 nm.

Figure 13:
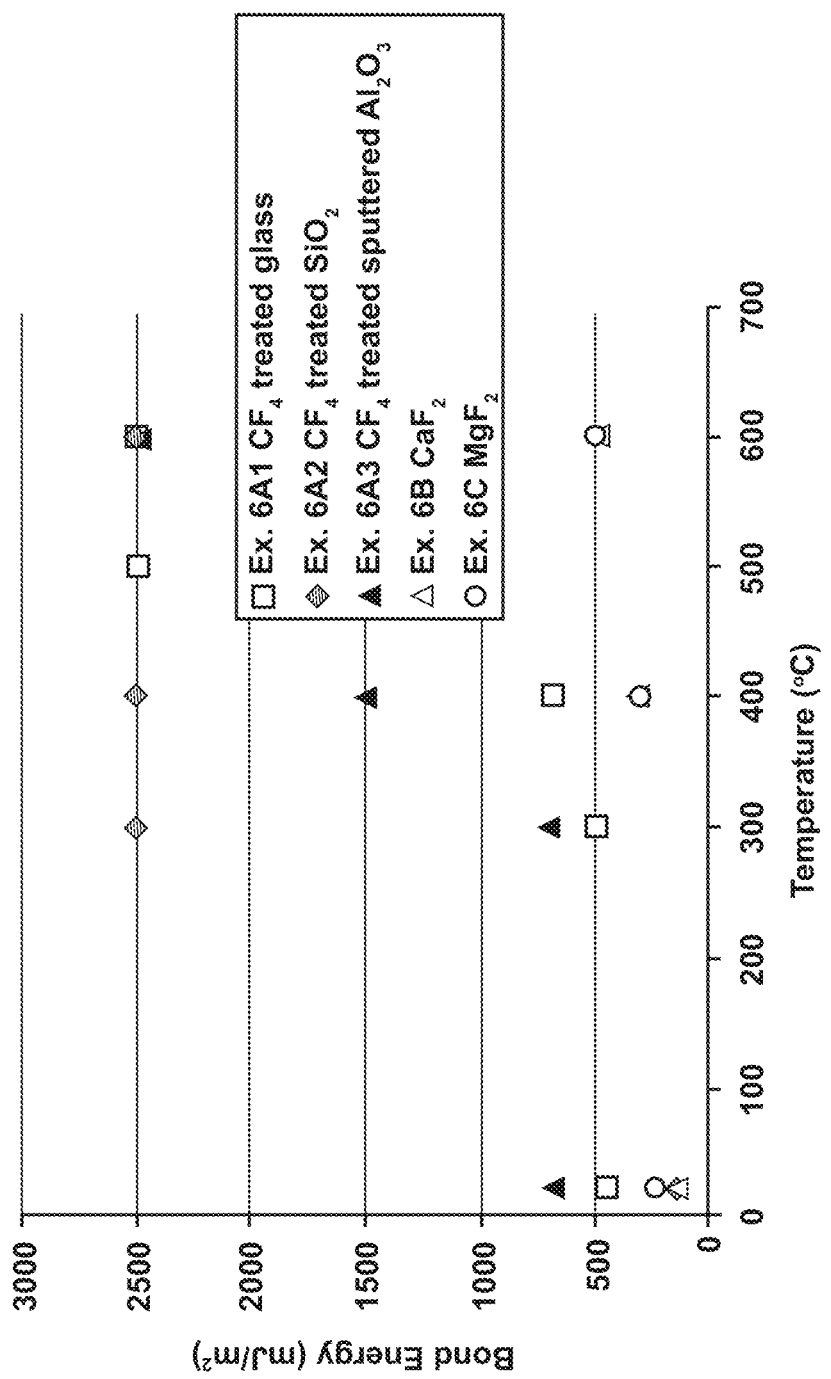
FIG. 13 is a graph of adhesion energy as a function of temperature for glass, silica and alumina surfaces on glass substrates subjected to various fluorine-containing surface treatments, as bonded to another glass surface, according to a further aspect of this disclosure.

The glass substrates of Examples 6A1-A3, 6B and 6C with crack mitigating layers formed via plasma-assisted fluorination or as discrete metal fluoride layers via e-beam evaporation (i.e., carriers) were then bonded to glass substrates comparable in composition to the carrier substrate. These laminated articles were then subjected to testing commensurate with Equation (11) to obtain adhesive energies indicative of the adhesive strength of the crack mitigating layers. The results of these measurements are depicted in FIG. 13 as a function of annealing temperature. In particular, some of the treated substrates of Examples 13A1-A3, 13B and 13C were subjected to annealing at various temperatures for 10 minutes to simulate elevated temperatures associated with film deposition over the crack mitigating layer and/or thermal processing associated with post-manufacturing thermal processing of the substrate associated with a particular application.

As the results in FIG. 13 demonstrate, all samples demonstrate relatively moderate adhesive energies of approximately 500 mJ/m² or less up to 300° C., indicative of crack mitigating layers that will aid in the retention of glass substrate strength. In comparing the adhesive energy data associated with Examples 6A1-A3, it is apparent that the $CF_4$-treated glass exhibits relatively low adhesive energies up to about 500° C., whereas the $CF_4$-treated $SiO_2$ and $Al_2O_3$-coated glass experiences a sharp increase in adhesive energy at 300 and 400° C., respectively. The implication is that fluorination of glass (Example 6A1) effectively moderates the adhesive energy up to 500° C. whereas fluorination of $SiO_2$ and $Al_2O_3$ (Examples 6A2 and 6A3) is not as beneficial. As such, the fluorination of other components in the glass (not $SiO_2$ and $Al_2O_3$) appears to provide beneficial adhesive energy stabilization as a function of temperature. Those "other components" in the glass are believed to be metal oxides, e.g., CaO, MgO, and others. It follows that the glass substrates in Examples 6B and 6C with discrete $CaF_2$ and $MgF_2$ crack mitigating layers, respectively, exhibit adhesive energies at no higher than approximately 500 $mJ/m^2$ up to 600° C.

Example 7: Ring-on-Ring Strength of Glass Substrates with e-Beam Deposited $CaF_2$ Crack Mitigating Layers and a Cr Film Examples 7A, 7B, and 7C1-C4 were made by providing 1.0 mm thick ion-exchange strengthened alkaline earth boro-aluminosilicate glass substrates. The glass substrate included a composition of at least about 50 mol % $SiO_2$, at least about 10 mol % $R_2O$ (which includes $Na_2O$), $Al_2O_3$, wherein $-0.5$ mol % $\leq Al_2O_3$ (mol %)$-R_2O$ (mol %)$\leq 2$ mol %; and $B_2O_3$, wherein $B_2O_3$ (mol %)$-(R_2O$ (mol %)$-Al_2O_3$ (mol %))$\leq 4.5$ mol %. The glass substrates were ion-exchanged in a $KNO_3$ molten salt bath having a temperature of about 350-450° C. for 3-8 hours. The ion-exchanged glass substrates had a compressive stress of about 883 MPa and an ion-exchange depth of layer of about 41.3 microns. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

The glass substrates of Example 7A were left bare, with no crack mitigating layers or films disposed thereon. The glass substrates of Example 7B were prepared with a 3000 Å Cr film, but no crack mitigating layer. The Cr film was deposited by an e-beam evaporative technique. The glass substrates of Example 7C1-C4 each included a $CaF_2$ crack mitigating layer, disposed on the surface of the glass substrate by e-beam evaporative techniques. The thickness of the $CaF_2$ crack mitigating layer in Examples 7C1-C4 was 200, 500, 1000 and 2000 Å, respectively. Further, the substrates of Example 7C1-C4 also included a 3000 Å Cr film.

Figure 14:
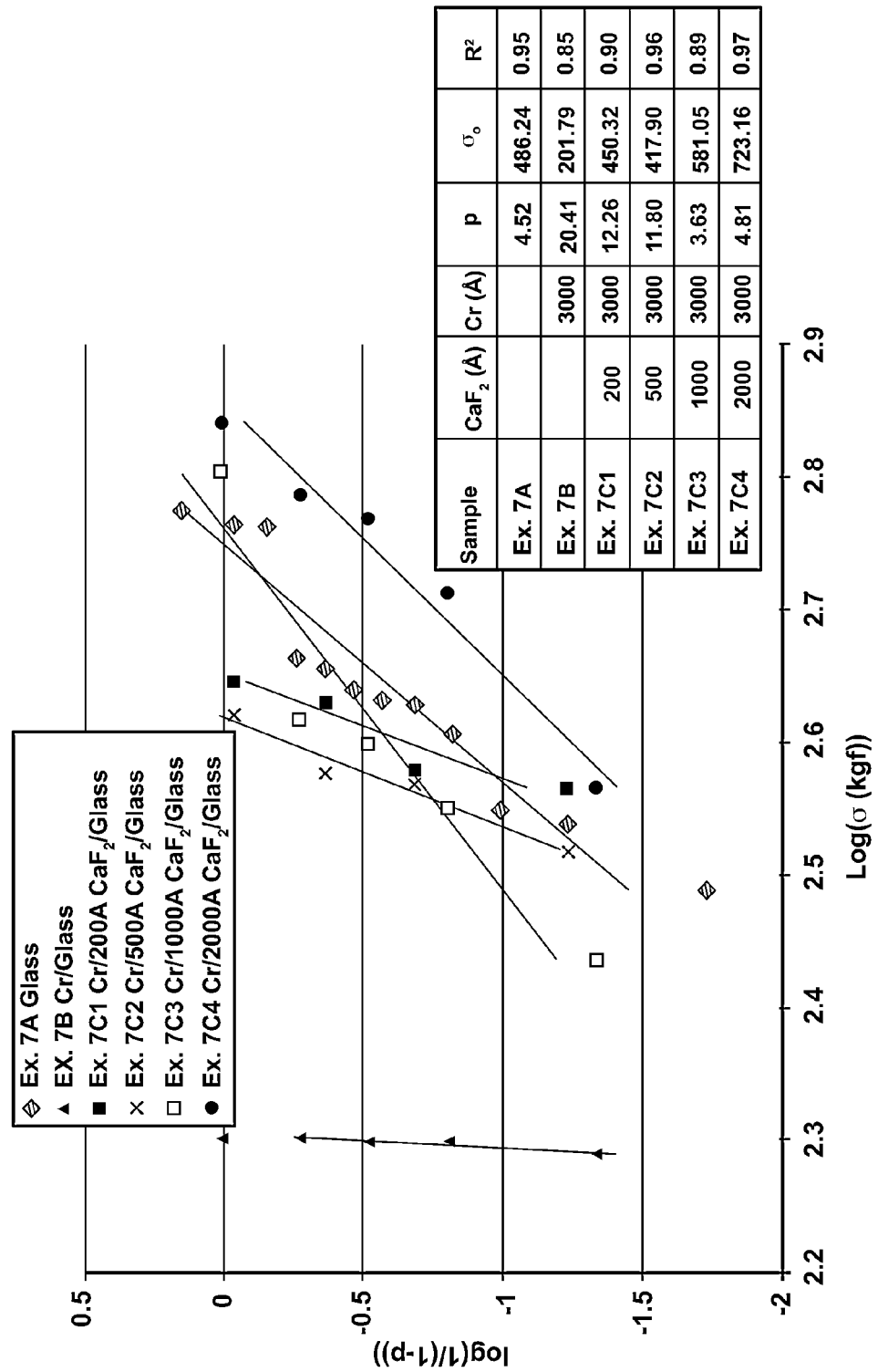
FIG. 14 is a graph presenting ring-on-ring load-to-failure performance of glass substrate controls and substrates having chromium films and calcium fluoride crack mitigating layers according to an aspect of this disclosure given by Examples 14A-14C4.

Ring-on-ring load to failure testing was used to demonstrate the retention of average flexural strength of Examples 7A, 7B and 7C1-C4, as shown in FIG. 14. For ring-on-ring load to failure testing, the side with the film and/or crack mitigating layer was in tension. The ring-on-ring load to failure testing parameters included a contact radius of 1.6 mm, a load ring diameter of 0.5 inches, and a support ring diameter of 1 inch. The test procedure was performed according to ASTM C1499. Before testing, an adhesive film was placed on both sides of the sample being tested to contain broken glass shards.

As illustrated in FIG. 14, the addition of a $CaF_2$ crack mitigating layer resulted in articles (Examples $7C_{1-7}C4$) that retained about the same average flexural strength as glass substrates without a $CaF_2$ crack mitigating layer or Cr film (Comparative Example 7A). Moreover, the articles with a $CaF_2$ crack mitigating layer exhibited greater average flexural strength and characteristic strength values ($\sigma_o$) than the strengthened and non-strengthened glass substrates with only a Cr film and no crack mitigating layer (i.e., Comparative Example 7B) which exhibited a substantial reduction in the average flexural strength and characteristic strength.

Example 8: Ring-on-Ring Strength of Glass Substrates with e-Beam Deposited $BaF_2$ Crack Mitigating Layers and a Cr Film Examples 8A, 8B, and 8C1-C2 were made by providing the same substrates as Example 14. The glass substrates of Example 8A were left bare, with no crack mitigating layers or films disposed thereon. The glass substrates of Example 8B were prepared with a 3000 Å Cr film, but no crack mitigating layer. The Cr film was deposited by an e-beam evaporative technique. The glass substrates of Example 8C1-C2 each included a $BaF_2$ crack mitigating layer, disposed on the surface of the glass substrate by e-beam evaporative techniques. The thickness of the $BaF_2$ crack mitigating layer in Examples 8C1-C2 was 500 and 1000 Å, respectively. Further, the substrates of Example 8C1-C2 also included a 3000 Å Cr film.

Figure 15:
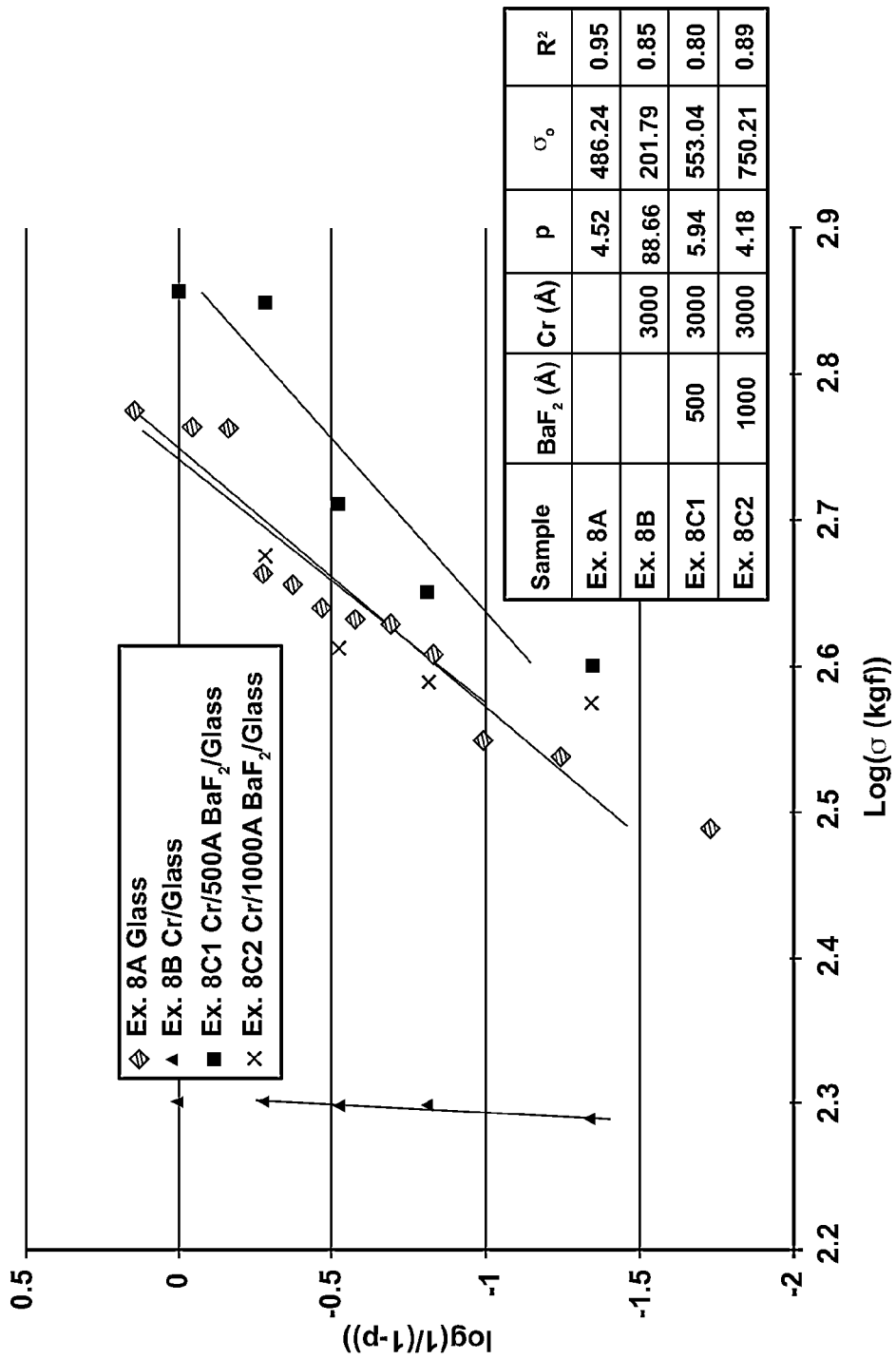
FIG. 15 is a graph presenting ring-on-ring load-to-failure performance of glass substrate controls and substrates having chromium films and barium fluoride crack mitigating layers according to an aspect of this disclosure given by Examples 15A-15C2.

Ring-on-ring load to failure testing was used to demonstrate the retention of average flexural strength of Examples 8A, 8B and 8C1-C2, as shown in FIG. 15. For ring-on-ring load to failure testing, the side with the film and/or crack mitigating layer was in tension. The ring-on-ring load to failure testing parameters included a contact radius of 1.6 mm, a load ring diameter of 0.5 inches, and a support ring diameter of 1 inch. The test procedure was performed according to ASTM C1499. Before testing, an adhesive film was placed on both sides of the sample being tested to contain broken glass shards.

As illustrated in FIG. 15, the addition of a $BaF_2$ crack mitigating layer resulted in articles (Examples 8C1-8C2) that retained about the same average flexural strength as glass substrates without a $BaF_2$ crack mitigating layer or Cr film (Comparative Example 8A). Moreover, the articles with a $BaF_2$ crack mitigating layer exhibited greater average flexural strength and characteristic strength values ($\sigma_o$) than the strengthened and non-strengthened glass substrates with only a Cr film and no crack mitigating layer (i.e., Comparative Example 8B) which exhibited a substantial reduction in the average flexural strength and characteristic strength.

Example 16: Ring-on-Ring Strength of Glass Substrates with e-Beam Deposited $MgF_2$ Crack Mitigating Layers and a Cr Film Examples 9A, 9B, and 9C were made by providing the same substrates as Example 14. The glass substrates of Example 9A were left bare, with no crack mitigating layers or films disposed thereon. The glass substrates of Example 9B were prepared with a 3000 Å Cr film, but no crack mitigating layer. The Cr film was deposited by an e-beam evaporative technique. The glass substrates of Example 9C each included a $MgF_2$ crack mitigating layer, disposed on the surface of the glass substrate by e-beam evaporative techniques. The thickness of the $MgF_2$ crack mitigating layer in Example 9C was 1000 Å. Further, the substrates of Example 9C also included a 3000 Å Cr film.

Figure 16:
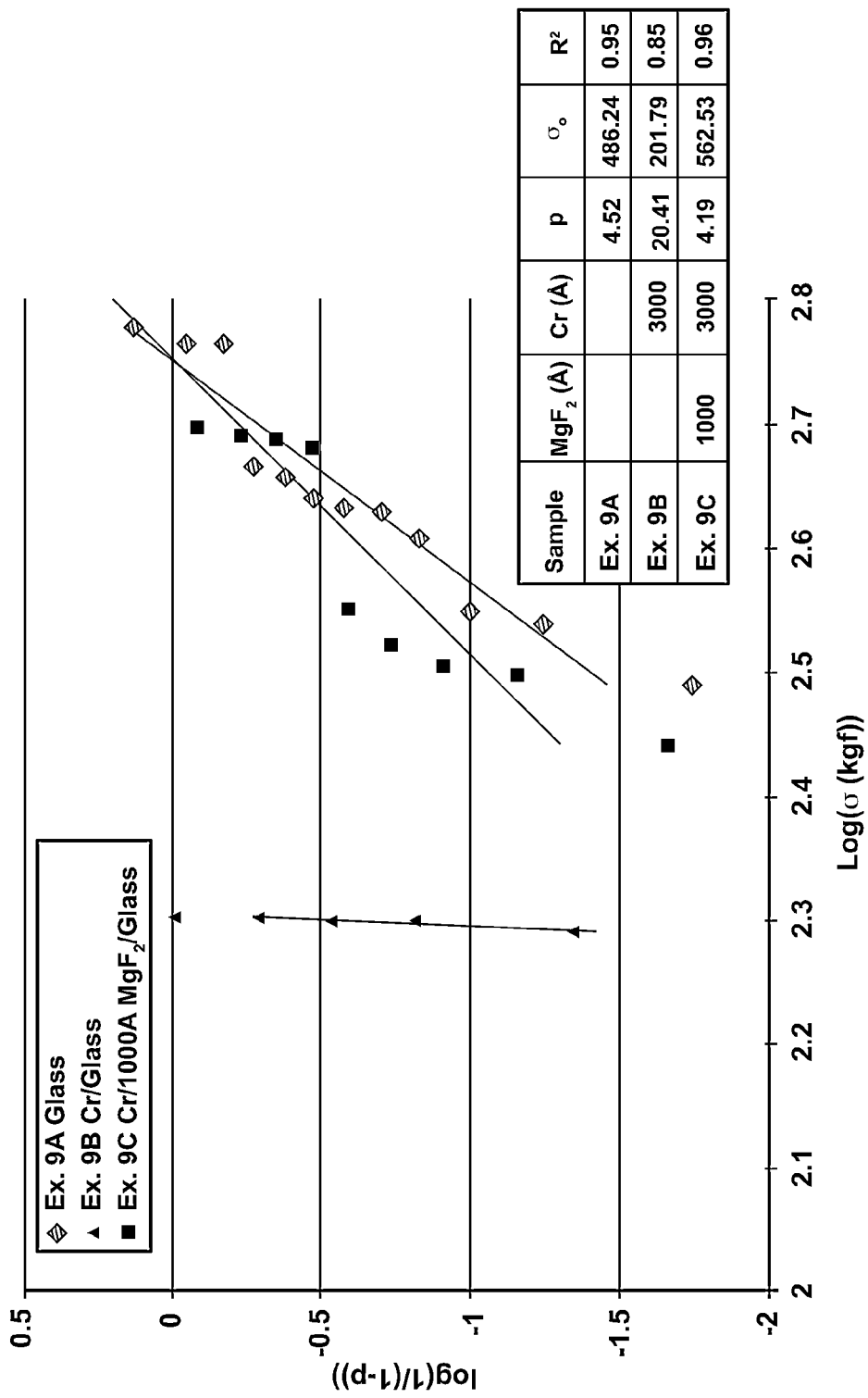
FIG. 16 is a graph presenting ring-on-ring load-to-failure performance of glass substrate controls and substrates having chromium films and magnesium fluoride crack mitigating layers according to an aspect of this disclosure given by Examples 16A-16C.

Ring-on-ring load to failure testing was used to demonstrate the retention of average flexural strength of Examples 9A, 9B and 9C, as shown in FIG. 16. For ring-on-ring load to failure testing, the side with the film and/or crack mitigating layer was in tension. The ring-on-ring load to failure testing parameters included a contact radius of 1.6 mm, a load ring diameter of 0.5 inches, and a support ring diameter of 1 inch. The test procedure was performed according to ASTM C1499. Before testing, an adhesive film was placed on both sides of the sample being tested to contain broken glass shards.

As illustrated in FIG. 16, the addition of a 1000 Å-thick MgF$_2$ crack mitigating layer resulted in articles (Example 9C) that retained about the same average flexural strength as glass substrates without a MgF$_2$ crack mitigating layer or Cr film (Comparative Example 9A). Moreover, the articles with a MgF$_2$ crack mitigating layer exhibited greater average flexural strength and characteristic strength values ($\sigma_o$) than the strengthened and non-strengthened glass substrates with only a Cr film and no crack mitigating layer (i.e., Comparative Example 9B) which exhibited a substantial reduction in the average flexural strength and characteristic strength.

Example 17: Ring-on-Ring Strength of Glass Substrates with e-Beam Deposited CaF$_2$ Crack Mitigating Layers and an ITO Film Examples 10A, 10B, and 10C were made by providing the same substrates as Example 14.

The glass substrates of Example 10A were left bare, with no crack mitigating layers or films disposed thereon. The glass substrates of Example 10B were prepared with a 1000 Å indium tin oxide ("ITO") film, but no crack mitigating layer. The ITO film was deposited by DC sputtering from a 10:90 (by weight) SnO$_2$:In$_2$O$_3$ oxide target at a pressure of 10 mTorr. The glass substrates of Example 10C each included a CaF$_2$ crack mitigating layer, disposed on the surface of the glass substrate by e-beam evaporative techniques. The thickness of the CaF$_2$ crack mitigating layer in Example 10C was 500 Å. Further, the substrates of Example 10C also included a 1000 Å ITO film.

Figure 17:
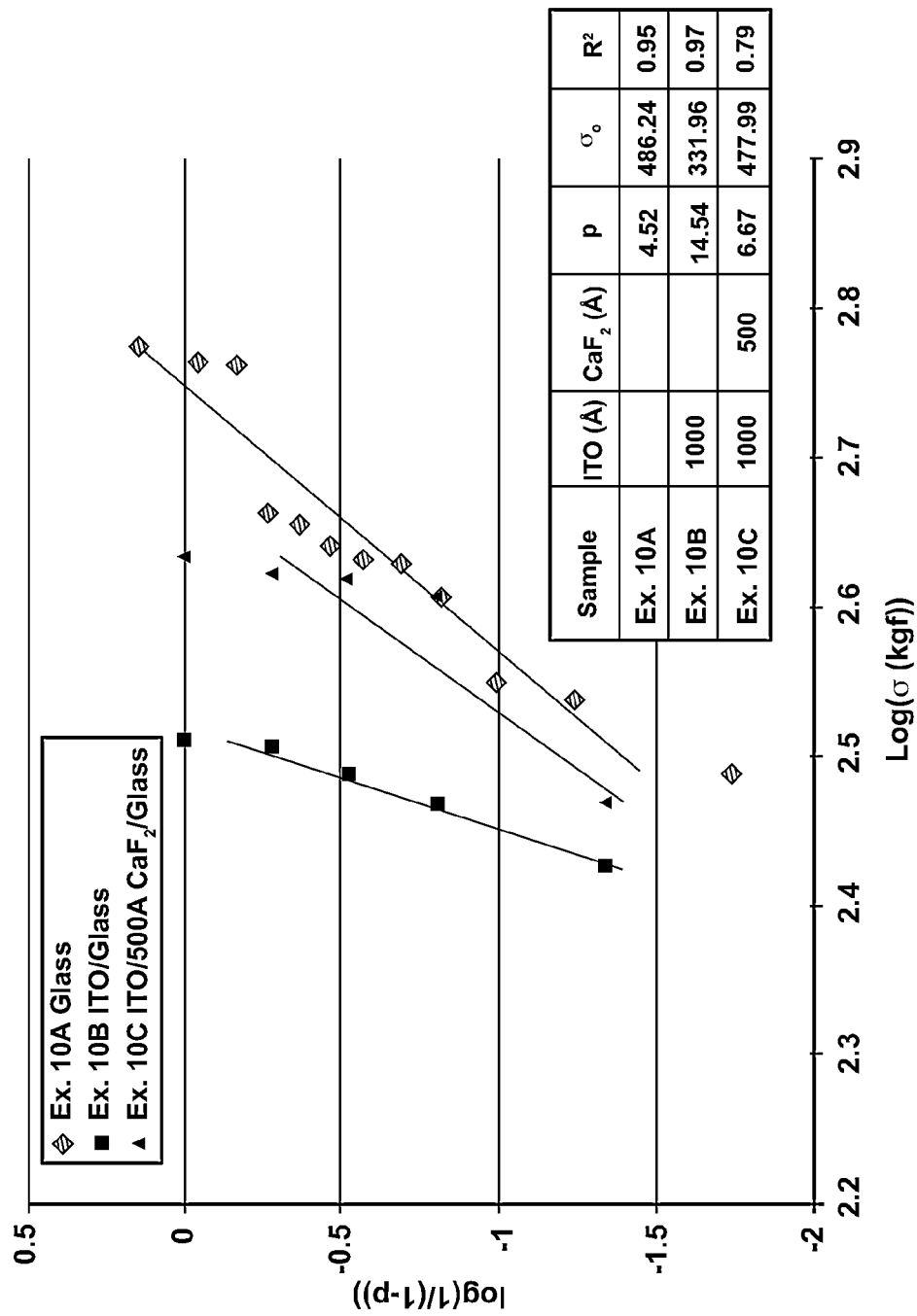
FIG. 17 is a graph presenting ring-on-ring load-to-failure performance of glass substrate controls and substrates having indium tin oxide films and calcium fluoride crack mitigating layers according to an aspect of this disclosure given by Examples 17A-17C.

Ring-on-ring load to failure testing was used to demonstrate the retention of average flexural strength of Examples 10A, 10B and 10C, as shown in FIG. 17. For ring-on-ring load to failure testing, the side with the film and/or crack mitigating layer was in tension. The ring-on-ring load to failure testing parameters included a contact radius of 1.6 mm, a load ring diameter of 0.5 inches, and a support ring diameter of 1 inch. The test procedure was performed according to ASTM C1499. Before testing, an adhesive film was placed on both sides of the sample being tested to contain broken glass shards.

As illustrated in FIG. 17, the addition of a 500 Å-thick CaF$_2$ crack mitigating layer resulted in articles (Example 10C) that retained about the same average flexural strength as glass substrates without a CaF$_2$ crack mitigating layer or ITO film (Comparative Example 10A). Moreover, the articles with a CaF$_2$ crack mitigating layer exhibited greater average flexural strength and characteristic strength values ($\sigma_o$) than the strengthened and non-strengthened glass substrates with only an ITO film and no crack mitigating layer (i.e., Comparative Example 10B) which exhibited a substantial reduction in the average flexural strength and characteristic strength.

Example 18: Ring-on-Ring Strength of Glass Substrates with e-Beam Deposited BaF$_2$ Crack Mitigating Layers and an ITO Film Examples 11A, 11B, and 11C1-C2 were made by providing the same substrate as used in Example 17. The glass substrates of Example 11A were left bare, with no crack mitigating layers or films disposed thereon. The glass substrates of Example 11B were prepared with a 1000 Å indium tin oxide ("ITO") film, but no crack mitigating layer. The ITO film was deposited by DC sputtering from a 10:90 (by weight) SnO$_2$:In$_2$O$_3$ oxide target at a pressure of 10 mTorr. The glass substrates of Examples 11C1-C2 each included a BaF$_2$ crack mitigating layer, disposed on the surface of the glass substrate by e-beam evaporative techniques. The thickness of the BaF$_2$ crack mitigating layer in Examples 11C1-C2 was 1000 and 2000 Å, respectively. Further, the substrates of Example 11C1-C2 also included a 1000 Å ITO film.

Figure 18:
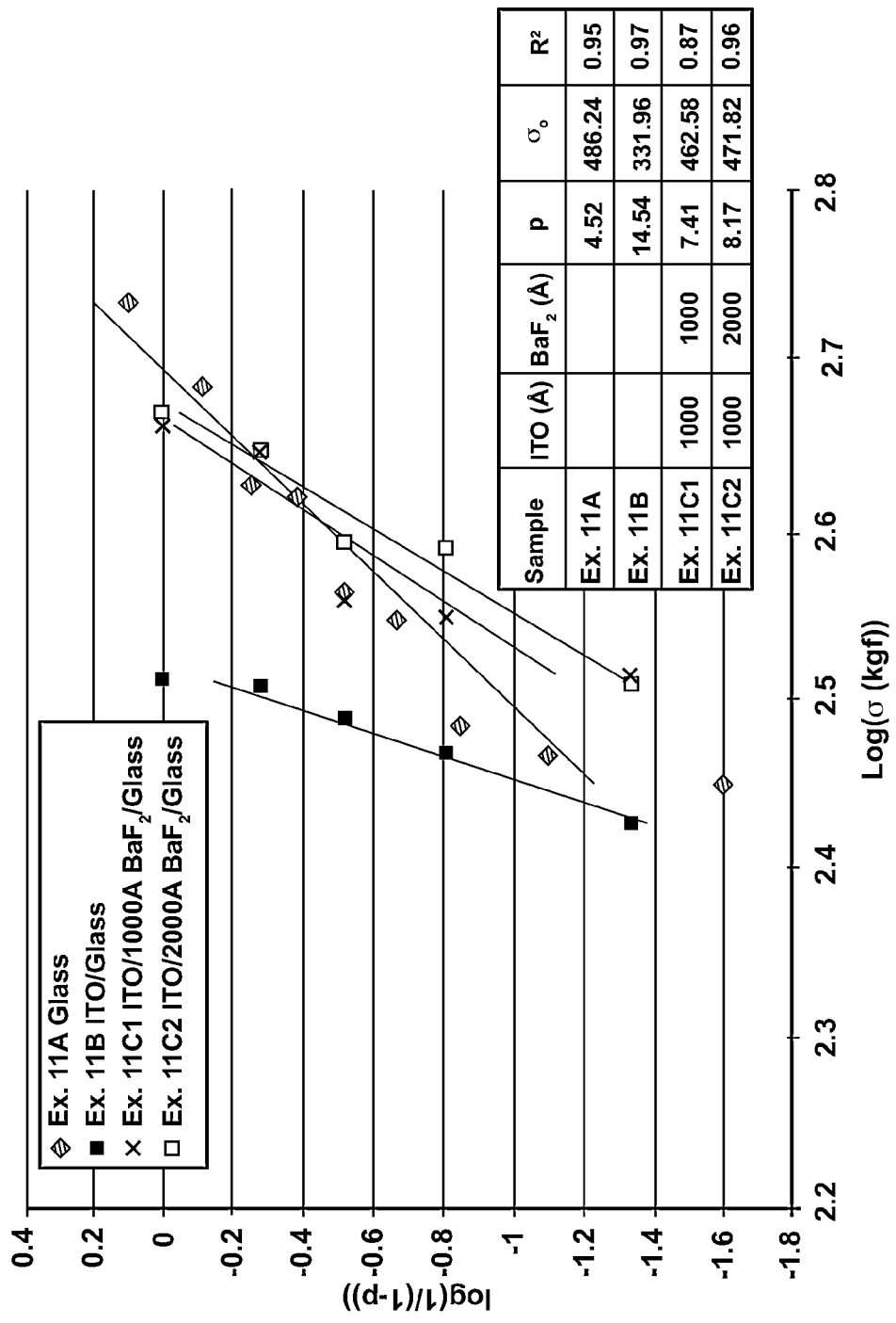
FIG. 18 is a graph presenting ring-on-ring load-to-failure performance of glass substrate controls and substrates having indium tin oxide films and barium fluoride crack mitigating layers according to an aspect of this disclosure given by Examples 18A-18C2.

Ring-on-ring load to failure testing was used to demonstrate the retention of average flexural strength of Examples 11A, 11B and 11C, as shown in FIG. 18. For ring-on-ring load to failure testing, the side with the film and/or crack mitigating layer was in tension. The ring-on-ring load to failure testing parameters included a contact radius of 1.6 mm, a load ring diameter of 0.5 inches, and a support ring diameter of 1 inch. The test procedure was performed according to ASTM C1499. Before testing, an adhesive film was placed on both sides of the sample being tested to contain broken glass shards.

As illustrated in FIG. 18, the addition of a BaF$_2$ crack mitigating layer resulted in articles (Example 11C1-C2) that retained about the same average flexural strength as glass substrates without a BaF$_2$ crack mitigating layer or ITO film (Comparative Example 11A). Moreover, the articles with a BaF$_2$ crack mitigating layer exhibited greater average flexural strength and characteristic strength values ($\sigma_o$) than the strengthened and non-strengthened glass substrates with only an ITO film and no crack mitigating layer (i.e., Comparative Example 11B) which exhibited a substantial reduction in the average flexural strength and characteristic strength.

While the disclosure has been described with respect to a limited number of embodiments for the purpose of illustration, those skilled in the art, having benefit of this disclosure, will appreciate that other embodiments can be devised which do not depart from the scope of the disclosure as disclosed herein. Accordingly, various modifications, adaptations and alternatives may occur to one skilled in the art without departing from the spirit and scope of the present disclosure.

We claim:
1. An article, comprising:
   a glass substrate having opposing major surfaces and a first average strain-to-failure;
   a crack mitigating layer disposed on a first major surface forming a first interface; and
   a film comprising chromium or indium tin oxide disposed on the crack mitigating layer forming a second interface, the film having a second average strain-to-failure that is less than the first average strain-to-failure,
   wherein at least one of the first interface and the second interface exhibits a moderate adhesion such that at least a portion of the crack mitigating layer experiences one or more of a cohesive failure, an adhesive failure at the first interface and an adhesive failure at the second interface when the article is strained to a strain level between the first average strain-to-failure and the second average strain-to-failure, and
   further wherein the crack mitigating layer comprises a discrete metal fluoride film having a thickness from 200 Angstroms to 2000 Angstroms.
2. The article of claim 1, wherein the crack mitigating layer has a thickness from 500 Angstroms to 1000 Angstroms.
3. The article of claim 1, wherein the metal fluoride film is derived from a vacuum deposition process.

4. The article of claim 1, wherein the glass substrate is chemically strengthened and has a compressive stress greater than about 500 MPa and a compressive depth-of-layer greater than about 15 μm.

5. The article of claim 1, wherein the crack mitigating layer comprises barium fluoride, calcium fluoride or magnesium fluoride.

6. An article, comprising:
a glass substrate having opposing major surfaces and having a first average strain-to-failure;
a crack mitigating layer disposed on a first major surface forming a first interface; and
a film comprising chromium or indium tin oxide disposed on the crack mitigating layer forming a second interface, the film having a second average strain-to-failure that is lower than the first average strain-to-failure,
wherein the article exhibits an effective adhesion energy at one or more of the first interface and the second interface of less than about 4 $J/m^2$, and
further wherein the crack mitigating layer comprises a discrete metal fluoride film having a thickness between 200 Angstroms and 2000 Angstroms.

7. The article of claim 6, wherein the effective adhesion energy is or less than about 0.85 $J/m^2$.

8. The article of claim 6, wherein the metal fluoride film is derived from a vacuum deposition process.

9. The article of claim 6, wherein the glass substrate is strengthened and has a compressive stress greater than about 500 MPa and a compressive depth-of-layer greater than about 15 μm.

10. The article of claim 6, wherein the crack mitigating layer comprises barium fluoride, calcium fluoride or magnesium fluoride.

11. An article, comprising:
a glass substrate having opposing major surfaces and having a first average strain-to-failure;
a crack mitigating layer disposed on a first major surface; and
a film comprising chromium or indium tin oxide disposed on the crack mitigating layer having a second average strain-to-failure that is lower than the first average strain-to-failure,
wherein the crack mitigating layer causes a crack originating in one of the film and the glass substrate and entering into the crack mitigating layer to remain substantially within the crack mitigating layer, and
further wherein the crack mitigating layer comprises a discrete metal fluoride film having a thickness between 200 Angstroms and 2000 Angstroms.

12. The article of claim 11, wherein the crack mitigating layer comprises barium fluoride, calcium fluoride or magnesium fluoride.

* * * * *